US012339252B2

(12) United States Patent
Cronin et al.

(10) Patent No.: US 12,339,252 B2
(45) Date of Patent: Jun. 24, 2025

(54) FLUID AERATION DETECTION SYSTEMS AND METHODS

(71) Applicant: Donaldson Company, Inc., Bloomington, MN (US)

(72) Inventors: Michael J. Cronin, Apple Valley, MN (US); Xiaobin Wang, Chanhassen, MN (US)

(73) Assignee: Donaldson Company, Inc., Bloomington, MN (US)

( * ) Notice: Subject to any disclaimer, the term of this patent is extended or adjusted under 35 U.S.C. 154(b) by 192 days.

(21) Appl. No.: 17/621,617

(22) PCT Filed: Jul. 2, 2020

(86) PCT No.: PCT/US2020/040625
§ 371 (c)(1),
(2) Date: Dec. 21, 2021

(87) PCT Pub. No.: WO2021/003346
PCT Pub. Date: Jan. 7, 2021

(65) Prior Publication Data
US 2022/0357302 A1 Nov. 10, 2022

Related U.S. Application Data

(60) Provisional application No. 62/870,386, filed on Jul. 3, 2019.

(51) Int. Cl.
*G01N 29/036* (2006.01)
*G01N 29/44* (2006.01)
(52) U.S. Cl.
CPC ....... *G01N 29/036* (2013.01); *G01N 29/4427* (2013.01)

(58) Field of Classification Search
CPC ............ G01N 29/036; G01N 29/4427; G01M 15/042; G01M 7/00; G01M 15/12;
(Continued)

(56) References Cited

U.S. PATENT DOCUMENTS

| 4,638,305 A | 1/1987 | Sutton |
| 5,033,858 A | 7/1991 | Twerdochlib et al. |

(Continued)

FOREIGN PATENT DOCUMENTS

| CN | 101715545 | 5/2010 |
| CN | 101965447 | 2/2011 |

(Continued)

OTHER PUBLICATIONS

ScienceDirect, Cavitation, https://www.sciencedirect.com/topics/chemistry/cavitation (Year: 2019).*

(Continued)

*Primary Examiner* — Tarun Sinha
(74) *Attorney, Agent, or Firm* — Pauly, DeVries Smith & Deffner LLC

(57) ABSTRACT

Embodiments herein relate to systems and methods for detecting aeration properties in fluids using a vibration sensor. In an embodiment, a system for fluid aeration monitoring is included having a vibration sensor configured to be mounted along a fluid flow path, and a control circuit in signal communication with the vibration sensor. The control circuit can be configured to evaluate a signal received from the vibration sensor and calculate one or more aeration parameters based on signals from the vibration sensor. Other embodiments are also included herein.

19 Claims, 16 Drawing Sheets

(58) Field of Classification Search
CPC ...... G01M 7/025; G01M 15/05; G01M 15/09; G01H 3/04; G06Q 50/10; G08C 17/02
See application file for complete search history.

(56) References Cited

U.S. PATENT DOCUMENTS

| | | | |
|---|---|---|---|
| 5,078,901 | A | 1/1992 | Sparrow |
| 5,388,629 | A * | 2/1995 | Kami ............... B22D 17/2236 164/151.1 |
| 5,880,674 | A | 3/1999 | Ufkes et al. |
| 6,260,004 | B1 * | 7/2001 | Hays ............... F04D 15/0088 702/183 |
| 8,461,519 | B2 | 6/2013 | Lievois et al. |
| 8,473,185 | B2 | 6/2013 | Suwa et al. |
| 8,781,673 | B2 | 7/2014 | Nunn et al. |
| 8,873,060 | B2 | 10/2014 | Webb et al. |
| 9,518,913 | B2 | 12/2016 | Wilhelm |
| 10,664,701 | B2 | 5/2020 | Gerber et al. |
| 11,131,627 | B2 | 9/2021 | Bachalo |
| 12,210,009 | B2 | 1/2025 | Goltzman et al. |
| 2003/0085180 | A1 | 5/2003 | Akins et al. |
| 2008/0121026 | A1 | 5/2008 | Verdegan |
| 2008/0237503 | A1 | 10/2008 | Albertson |
| 2009/0038406 | A1 | 2/2009 | Hocker |
| 2009/0050809 | A1 | 2/2009 | Holec |
| 2009/0101822 | A1 | 4/2009 | Mitra et al. |
| 2009/0241672 | A1 | 10/2009 | Gysling |
| 2010/0134304 | A1 * | 6/2010 | Weinstein ............... G01F 1/74 73/1.16 |
| 2012/0027630 | A1 | 2/2012 | Forsberg et al. |
| 2012/0046848 | A1 | 2/2012 | Suwa et al. |
| 2012/0223515 | A1 | 9/2012 | Avramescu et al. |
| 2012/0312530 | A1 | 12/2012 | Pope et al. |
| 2014/0047827 | A1 | 2/2014 | Maoued et al. |
| 2014/0216602 | A1 | 8/2014 | Kastner et al. |
| 2014/0268156 | A1 | 9/2014 | Smythe et al. |
| 2014/0331742 | A1 * | 11/2014 | Campbell ............ G01N 33/2841 73/19.1 |
| 2015/0021482 | A1 | 1/2015 | Mller et al. |
| 2015/0276589 | A1 | 10/2015 | Wagner et al. |
| 2016/0011100 | A1 | 1/2016 | Cipullo et al. |
| 2016/0258870 | A1 | 9/2016 | Tokhtuev et al. |
| 2017/0329355 | A1 | 11/2017 | Kanade |
| 2017/0356838 | A1 | 12/2017 | Knollenberg et al. |
| 2019/0242814 | A1 | 8/2019 | Bachalo |
| 2020/0400544 | A1 * | 12/2020 | Etschmaier ......... G01N 15/0625 |
| 2020/0400559 | A1 | 12/2020 | Martensson et al. |
| 2021/0223154 | A1 | 7/2021 | Moravec et al. |
| 2021/0310942 | A1 | 10/2021 | Jones et al. |
| 2022/0107303 | A1 | 4/2022 | Goltzman et al. |
| 2023/0296529 | A1 | 9/2023 | Moravec et al. |

FOREIGN PATENT DOCUMENTS

| | | |
|---|---|---|
| CN | 102373987 | 3/2012 |
| CN | 103576640 | 2/2014 |
| CN | 108374695 | 8/2018 |
| EP | 2869057 | 5/2015 |
| EP | 3698826 | 8/2020 |
| EP | 3745096 | 12/2020 |
| GB | 2568089 | 5/2019 |
| JP | S60161546 | 8/1985 |
| JP | 2010053691 | 3/2010 |
| JP | 2010528319 | 8/2010 |
| JP | 2017223672 | 12/2017 |
| KR | 20060041569 | 5/2006 |
| KR | 20230133468 | 9/2023 |
| WO | 2008147408 | 12/2008 |
| WO | 2010111231 | 9/2010 |
| WO | 2013185023 | 12/2013 |
| WO | 2019108731 | 6/2019 |
| WO | 2019232305 | 12/2019 |
| WO | 2021003346 | 1/2021 |
| WO | 2022076747 | 4/2022 |
| WO | 2023177728 | 9/2023 |

OTHER PUBLICATIONS

Minnesota Rural Water Association, Aeration, https://www.mrwa.com/WaterWorksMnl/Chapter%2011%20Aeration.pdf (Year: 2011).*
Merriam Webster, Vapor, https://www.merriam-webster.com/dictionary/vapor (Year: 2024).*
"Elveflow Microfluidic Bubble Detector Product Information," from Elveflow 2021 Product Catalog. Accessible at URL <elveflow.com/microfluidic-flow-control-products/microfluidic-flow-control-module/microfluidic-liquid-sensor/> (2 pages).
"International Search Report and Written Opinion," for PCT Application No. PCT/US2020/040625 mailed Oct. 26, 2020 (13 pages).
"Final Office Action," for U.S. Appl. No. 17/496,385 mailed Dec. 13, 2023 (31 pages).
"First Office Action," for Chinese Patent Application No. 202080045491.5 mailed Aug. 11, 2023 (30 pages) with English Translation.
"International Preliminary Report on Patentability," for PCT Application No. PCT/US2021/054055 mailed Apr. 20, 2023 (15 pages).
"International Search Report and Written Opinion," for PCT Application No. PCT/US2023/015280 mailed Jul. 14, 2023 (13 pages).
"Non-Final Office Action," for U.S. Appl. No. 17/496,385 mailed Aug. 3, 2023 (34 pages).
"Response to Communication Pursuant to Rules 161(1) and 162 EPC," for European Patent Application No. 20757982.2 filed Aug. 16, 2022 (34 pages).
"Response to Non Final Office Action," for U.S. Appl. No. 17/496,385, filed on Nov. 2, 2023 (12 pages).
"International Preliminary Report on Patentability," for PCT Application No. PCT/US2020/040625 mailed Jan. 13, 2022 (9 pages).
"International Search Report and Written Opinion," for PCT Application No. PCT/US2021/054055 mailed Mar. 14, 2022 (21 pages).
"Invitation to Pay Additional Fees," for PCT Application No. PCT/US2021/054055 mailed Jan. 19, 2022 (16 pages).
"Non-Final Office Action," for Japanese Patent Application No. 2021-571466 mailed Mar. 1, 2024 (7 pages).
"Non-Final Office Action," for U.S. Appl. No. 17/496,385 mailed Apr. 8, 2024 (56 pages).
"Response to Final Office Action," for U.S. Appl. No. 17/496,385, filed on Mar. 13, 2024 (12 pages).
"Second Office Action," for Chinese Patent Application No. 202080045491.5 mailed Mar. 2, 2024 (20 pages) with English Translation.
"Response to Non Final Office Action," for U.S. Appl. No. 17/496,385, filed on Jun. 28, 2024 (19 pages).
"Non-Final Office Action," for U.S. Appl. No. 18/115,464 mailed Dec. 3, 2024, 23 pages.
"Response to Non-Final Rejection," mailed on Dec. 3, 2024, for U.S. Appl. No. 18/115,464, submitted via Patent Center on Feb. 21, 2025, 9 pages.
"Final Office Action," for Chinese Patent Application No. 202080045491.5 mailed Jul. 4, 2024 (27 pages) with English translation.
"International Preliminary Report on Patentability," for PCT Patent Application No. PCT/US2023/015280 mailed Sep. 26, 2024 (9 pages).
"Notice of Allowance," for U.S. Appl. No. 17/496,385 mailed Sep. 28, 2024 (22 pages).
"Notice of Allowance," for U.S. Appl. No. 18/115,464 mailed Apr. 1, 2025 (13 pages).

* cited by examiner

FLUID AERATION DETECTION SYSTEMS AND METHODS

This application is being filed as a PCT International Patent application on Jul. 2, 2020, in the name of Donaldson Company, Inc., a U.S. national corporation, applicant for the designation of all countries, and Michael J. Cronin, a citizen of the U.S., as an inventor, and Xiaobin Wang, a citizen of the U.S., as an inventor, and claims priority to U.S. Provisional Patent Application No. 62/870,386, filed Jul. 3, 2019, the contents of which are herein incorporated by reference in its entirety.

FIELD

Embodiments herein relate to detection of aeration in fluids. More specifically, embodiments herein relate to systems and methods for detecting one or more aeration parameters in fluids using a vibration sensor.

BACKGROUND

The entrapment of air in fluids is known as "aeration." Aeration can include the total content of air resulting from both free air (bubbles) and dissolved air. Pressure can impact aeration of a fluid. For example, the saturation limit of a gas in a liquid varies with pressure such that, all things being equal, as pressure increases the saturation limit also increases. As another example, cavitation is a phenomenon in which changes in pressure lead to the formation and later implosion of bubbles generating vibration.

Aeration of fluids (such as hydraulic fluid, engine oil, fuel, etc.) in equipment can lead to various problems including oil degradation, accelerated wear of components (valves, pumps, etc.), reduced bulk modulus (leading to imprecise control of hydraulic components), decreased engine performance, and various other inefficiencies. Cavitation can result in damage to various components including valves, pumps, propellers, impellers, and the like.

Aeration has many potential causes. In some cases, air may leak in through worn seals. In some cases, air may leak in through suction line leaks. In some cases, aeration may stem from low fluid levels and/or operating on an incline. In some cases, aeration may result from low residence time in a reservoir and/or high circulation rates. In some cases, aeration may result from agitation within a fluid reservoir. In some cases, free air aeration may result from cavitation.

SUMMARY

Embodiments herein relate to systems and methods for detecting aeration parameters in fluids using a vibration sensor. In an embodiment, a system for fluid aeration monitoring is included having a vibration sensor configured to be mounted along a fluid flow path (such as in or along a fluid pipe or hose, in or on a fluid reservoir, in or on a pump or a pump head, in or on a fluid filter housing, etc.), and a control circuit in signal communication with the vibration sensor. The control circuit can be configured to evaluate a signal received from the vibration sensor to determine signal content of interest, which may include overall amplitude, frequencies of vibration and magnitudes of vibration at particular frequencies. The control circuit can further be configured to calculate one or more aeration parameters based on the frequencies and magnitudes of vibration.

In an embodiment, a method of determining aeration of a fluid in a fluid flow path is included. The method can include detecting vibrations with a vibration sensor mounted along the fluid flow path. The method can also include sending signals from the vibration sensor to a control circuit. The method can also include evaluating signals received at the control circuit from the vibration sensor to determine frequencies of vibration and magnitudes of vibration at particular frequencies. The method can also include calculating one or more aeration parameters based on the frequencies and magnitudes of vibration.

In an embodiment, a system for fluid aeration tracking is included. The system can include a vibration sensor configured to be mounted along a fluid flow path that generates a vibration signal. The system can include a control circuit in signal communication with the vibration sensor. The control circuit can be configured to calculate a feature value of the vibration signal and estimate a fluid aeration value based on the calculated feature value.

In an embodiment, a method of determining aeration of a fluid in a fluid flow path is included. The method can include detecting vibrations with a vibration sensor mounted along the fluid flow path, sending signals from the vibration sensor to a control circuit, and processing signals received at the control circuit from the vibration sensor to calculate a feature value of the vibration signal and estimate a fluid aeration value based on the calculated feature value.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As described above, aeration of fluids (such as hydraulic fluid, engine oil, fuel, etc.) in equipment can lead to various problems including oil degradation, accelerated wear of components (valves, pumps, etc.), reduced bulk modulus (leading to imprecise control of hydraulic components), decreased engine performance, and various other inefficiencies.

Therefore, measurement of aeration can be important in the context of operating and maintaining equipment. In some cases, measurement of aeration can be used to trigger various actions when aeration rises above a threshold value. For example, in some cases, detecting that aeration is above a threshold value can be used to trigger an action for mitigation of aeration. In some cases, detecting that aeration is above a threshold value can be used to notify a vehicle operator or vehicle maintenance specialist to initiate diagnosis of the cause of aeration. In some cases, regardless of crossing a threshold value, detection of aeration can be used to evaluate the status of a piece of equipment over time such that trends in aeration can be evaluated to detect possible problems.

Various embodiments herein can be used to monitor aeration and/or measure or estimate one or more aeration parameters. In some embodiments, the measurement of aeration can be performed with relatively low-cost components. In some embodiments, the measurement of aeration can be performed quickly and accurately leading to a monitoring system that is practically usefully for real-world scenarios (e.g., outside of lab settings).

Figure 1:
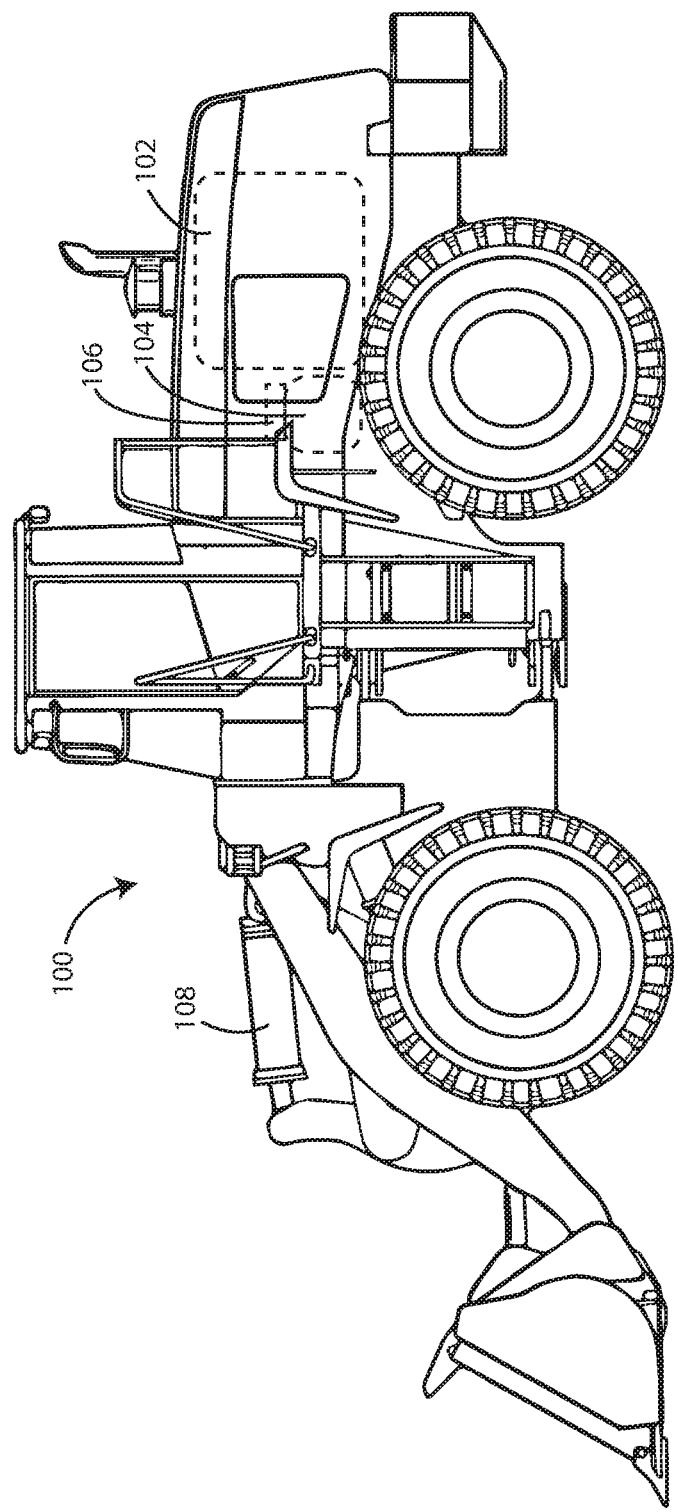
FIG. 1 is a diagram of a piece of equipment including a hydraulic system in accordance with various embodiments herein.

Referring now to FIG. 1, a diagram of a heavy equipment piece 100 including a hydraulic system is shown in accordance with various embodiments herein. The heavy equipment piece 100 can be, for example, a piece of mobile heavy equipment such as a wheel loader, bulldozer, grader, dump truck, or the like. However, it will be appreciated that pieces of equipment herein can also include stationary equipment. In some cases, pieces of equipment herein can include cooling systems, industrial water treatment systems, and the like. Many different types of equipment are contemplated herein.

The heavy equipment piece 100 can include an engine 102. In some cases, the engine 102 can, specifically, be a diesel engine. However, other types of engines are contemplated herein including gasoline engines and electric motors. The heavy equipment piece 100 can include a hydraulic actuator including a hydraulic cylinder 108 as an example of a hydraulic application. In this case, the hydraulic cylinder 108 can be used to raise and lower a loader arm and bucket. However, it will be appreciated that hydraulic cylinders can be used for various tasks. The heavy equipment piece 100 can also include a hydraulic pump 104 to power the hydraulic cylinder 108. A system for fluid aeration monitoring 106 (or "monitoring system") can also be included and is described in greater detail below.

Figure 2:
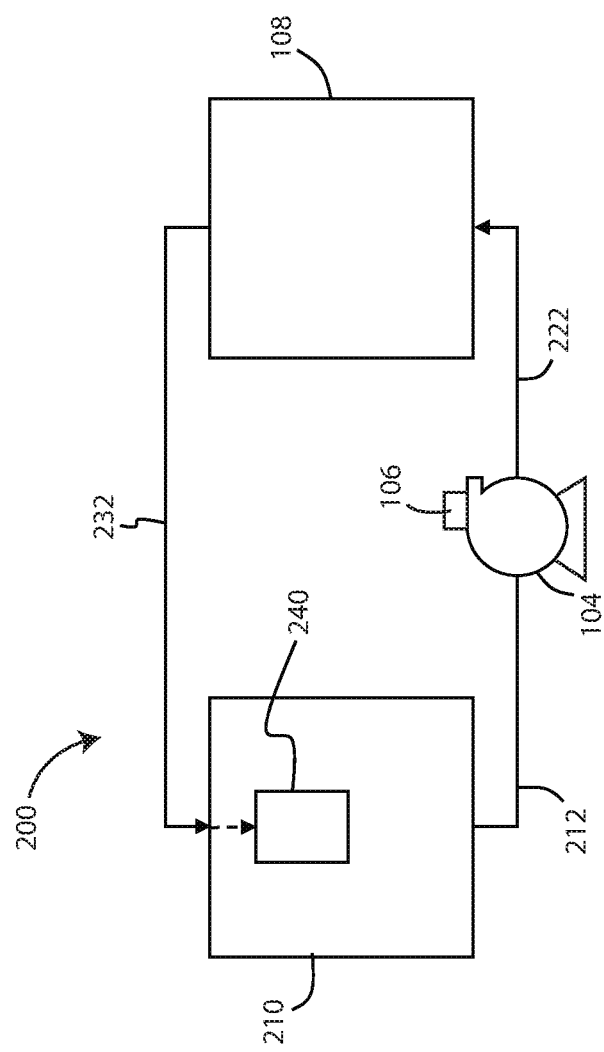
FIG. 2 is a schematic diagram of a hydraulic system in accordance with various embodiments herein.

Referring now to FIG. 2, a schematic diagram of a hydraulic system is shown in accordance with various embodiments herein. The hydraulic system 200 includes a tank 210 for housing a hydraulic fluid. The hydraulic system 200 also includes a hydraulic pump 104 that transfers fluid from the tank 210 to one or more hydraulic applications, such as hydraulic cylinder 108. Examples of hydraulic applications include hydraulic machines, hydraulic drive systems, hydraulic transmission systems, hydraulic brakes, and the like. The fluid flows from the tank 210 to the hydraulic pump 104 via output line 212 and from the hydraulic pump 104 to the hydraulic cylinder 108 via output line 222. The hydraulic pump 104 applies pressure to the fluid, and thus fluid in the output line 222 is under a higher pressure than fluid in the tank 210 or in the output line 212. The pressurized fluid may be used to perform work in the hydraulic cylinder 108. The fluid may return from the hydraulic cylinder 108 to the tank via return line 232.

The system for fluid aeration monitoring 106 can be used to detect aeration in the fluid that moves in the hydraulic system. The system for fluid aeration monitoring 106 can be used to calculate various aeration parameters as described in greater detail below. The hydraulic system 200 may include additional components, such as additional tanks, lines, pumps, meters, controls, etc.

Optionally, in some embodiments, the hydraulic system 200 can include a deaerator 240. The deaerator 240 is constructed to remove at least a portion of gas dissolved or entrapped in the fluid. The deaerator 240 may be positioned within the tank 210 as shown, or may be placed elsewhere in the hydraulic system 200. For example, the deaerator 240 may be placed in-line along the return line 232. According to an embodiment, the deaerator 240 is arranged in a flow path of fluid flowing through or within the tank 210. For example, the deaerator 240 may be placed in the flow path of fluid discharged into the tank 210 from the return line 232. The direction of flow may be from top to bottom, as shown in FIG. 2, where fluid from the return line 232 flows into the tank 210 from the top. At least a portion of the fluid from the return line 232 may enter the deaerator 240.

Figure 3:
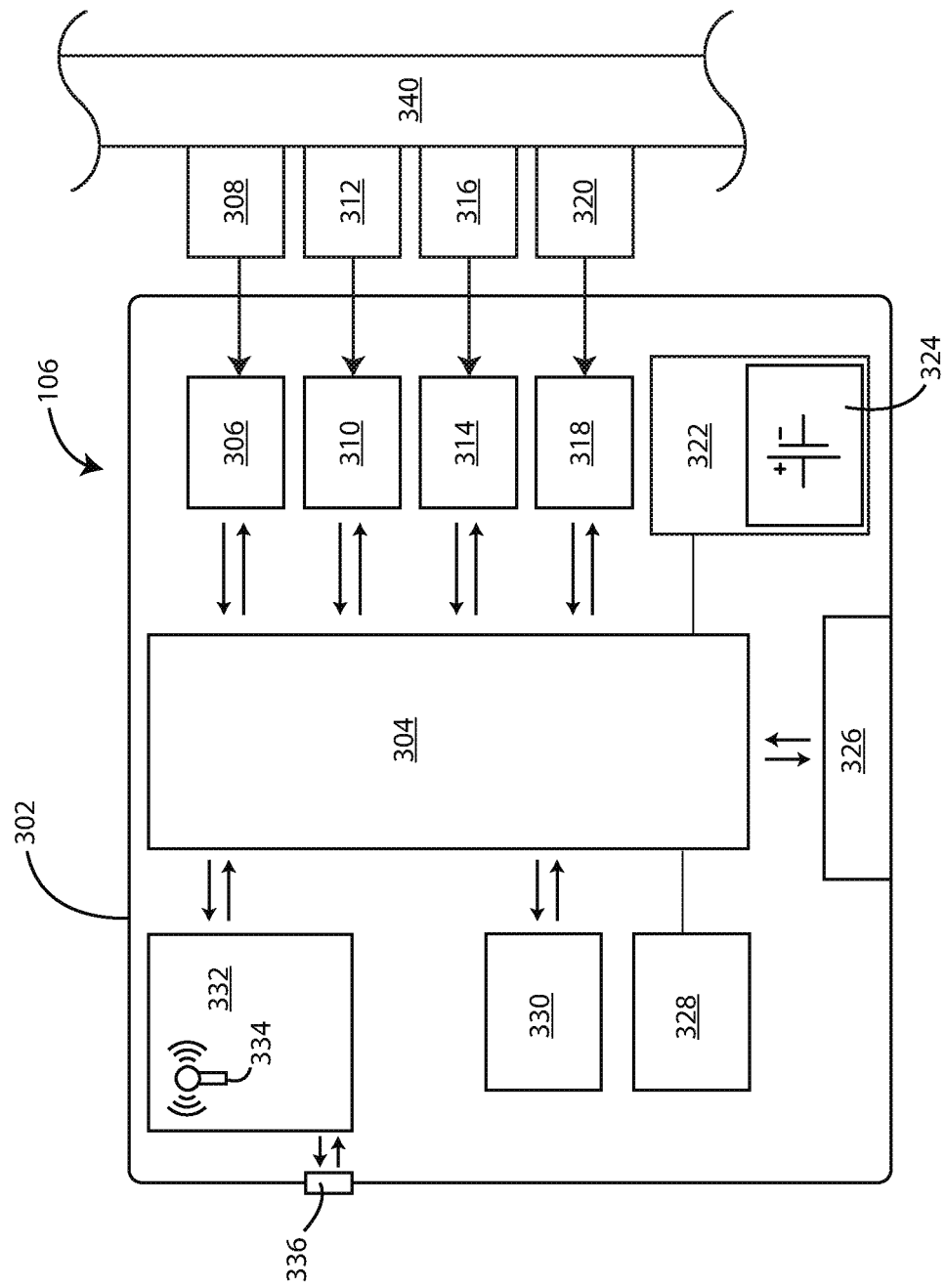
FIG. 3 is a schematic diagram of elements of a monitoring system in accordance with various embodiments herein.

Referring now to FIG. 3, a schematic diagram is shown of elements of a system for fluid aeration monitoring (or "monitoring system") 106 in accordance with various embodiments herein. It will be appreciated that a greater or lesser number of components can be included with various embodiments and that this schematic diagram is merely illustrative. The monitoring system 106 can include a housing 302 and a control circuit 304.

The control circuit 304 can include various electronic components including, but not limited to, a microprocessor, a microcontroller, a FPGA (field programmable gate array) chip, an application specific integrated circuit (ASIC), one or more digital signal processing chips, or the like.

In various embodiments, the monitoring system 106 can include a vibration sensor 308 and a vibration sensor channel interface 306. In various embodiments, the monitoring system 106 can include a temperature sensor 312 and a temperature sensor channel interface 310. In various embodiments, the monitoring system 106 can include a pressure sensor 316 and a pressure sensor channel interface 314. In various embodiments, the monitoring system 106 can include a flow sensor 320 and a flow sensor channel interface 318. The sensors can be configured and mounted in order to detect fluid conditions within a fluid flow path 340. The fluid flow path 340 can, in some cases, form part of a device such as a pump, a valve, a filter housing, or the like. The fluid flow path 340 can include, in some embodiments, a hydraulic fluid conduit, a lubricating oil conduit, a brake fluid conduit, a refrigerant fluid conduit, a fuel supply conduit, or a water flow conduit, amongst others.

In some cases, the sensor can be positioned so as to maximize their sensitivity. By way of example, in some embodiments, an accelerometer (1, 2, 3 axis, etc.) can be used as a vibration sensor and can be positioned so that at least one axis of sensitivity is aligned with an axis of movement of a component of a pump, such as a reciprocating component thereof.

The channel interfaces can include various components such as amplifiers, analog-to-digital converters (ADCs), digital-to-analog converters (DACs), digital signal processors (DSPs), filters (high-pass, low-pass, band-pass) and the like. In some cases, the channel interfaces may not exist as discrete components but, rather, can be integrated into the control circuit 304.

As used herein, the term "vibration" shall refer to oscillations (periodic, random or a combination thereof) of an object/structure and, unless the context dictates otherwise, shall also include reference to the pressure waves (or sound) that may result from vibrating objects/structure or that can induce the vibration of objects/structures.

Some sensors of various types used with embodiments herein can specifically be high sample rate sensors. High sample rate sensors can include those that sample at rate of 1,000, 1,500, 2,000, 2,500, 3,000, 5,000, 10,000, 15,000, 20,000 Hz or higher, or at a rate falling within a range between any of the foregoing. In various embodiments the high-speed pressure sensor can have a response time of less than 10, 5, 2.5, 1, 0.5, 0.25, 0.1, 0.05 or 0.01 milliseconds, or a response time falling within a range between any of the foregoing.

Vibration sensors herein can be of various types. By way of example, in some embodiments the vibration sensor 308 can be an accelerometer. In some embodiments, the vibration sensor 308 can, specifically, be a multi-axis accelerometer such as a three-axis accelerometer. Accelerometers can include both DC-response accelerometers and AC-response accelerometers. Accelerometers can include capacitive MEMS accelerometers, piezoresistive accelerometers, piezoelectric accelerometers (including charge mode piezoelectric accelerometers and voltage mode internal electronic piezoelectric (IEPE) accelerometers), and the like. In some embodiments, the vibration sensor can be an acoustical transducer, such as a microphone or the like. Microphones can include, but are not limited to condenser (including diaphragm condenser) microphones, ribbon microphones, dynamic (including induction coil) microphones, and the like. In some cases, a vibration sensor can also include a high-speed pressure sensor, such as those described below. Various vibration sensors are contemplated herein.

Temperature sensors herein can be of various types. In some embodiments, the temperature sensor 312 can be a thermistor, a resistance temperature device (RTD), a thermocouple, a semiconductor temperature sensor, or the like.

Pressure sensors herein can be of various types. The pressure sensor 316 can include, but is not limited to, strain gauge type pressure sensors, capacitive type pressure sensors, piezoelectric type pressure sensors, and the like. In some embodiments, pressure sensors herein can be MEMS-based pressure sensors. In various embodiments, the pressure sensor can be a high-speed (e.g., high sample rate) pressure sensor. In various embodiments the high-speed pressure sensor can sample at rates of 1,000, 1,500, 2,000, 2,500, 3,000, 5,000, 10,000, 15,000, 20,000 Hz or higher, or at a rate falling within a range between any of the foregoing. In various embodiments the high-speed pressure sensor can have a response time of less than 10, 5, 2.5, 1, 0.5, 0.25, 0.1, 0.05 or 0.01 milliseconds, or a response time falling within a range between any of the foregoing.

Flow sensors herein can be of various types. The flow sensor 320 can include, but is not limited to, a turbine flow sensor, a rotation speed sensor, a nutating disk flow sensor, an electromagnetic flow sensor, a thermal mass flow sensor, a pressure-based flow sensor, a vortex flow sensor, a Coriolis flow sensor, and the like.

The processing power of the control circuit 304 and components thereof can be sufficient to perform various operations including various operations on signals/data from sensors (such as sensors 308, 312, 316, and 320) including, but not limited to averaging, time-averaging, statistical analysis, normalizing, aggregating, sorting, deleting, traversing, transforming, condensing (such as eliminating selected data and/or converting the data to a less granular form), compressing (such as using a compression algorithm), merging, inserting, time-stamping, filtering, discarding outliers, calculating trends and trendlines (linear, logarithmic, polynomial, power, exponential, moving average, etc.), normalizing data/signals, and the like. Fourier analysis can decompose a physical signal into a number of discrete frequencies, or a spectrum of frequencies over a continuous range. In various embodiments herein, operations on signals/data can include Fast Fourier Transformations (FFT) to convert data/signals from a time domain to a frequency domain. Other operations on signals/data here can include spectral estimation, frequency domain analysis, calculation of root mean square acceleration value ($G_{RMS}$), calculation of acceleration spectral density, power spectral densities, Fourier series, Z transforms, resonant frequency determination, harmonic frequency determination, and the like. It will be appreciated that while various of the operations described herein (such as Fast Fourier transforms) can be performed by general-purpose microprocessors, they can also be performed more efficiently by digital signal processors (DSPs) which can, in some embodiments, be integrated with the control circuit 304 or may exist as separate, discrete components.

Normalizing operations performed by the control circuit 304 can include, but are not limited to, adjusting one or more values based on another value or set of values. In some embodiments herein, normalizing operations can specifically include normalizing the vibration sensor signals based on a pump operating speed or other equipment operating speed. As an example, a pump may have an operating frequency (speed). Characteristically, a vibration sensor of the system is likely to pick up a significant amount of vibration at a frequency that is at or near the operating frequency of the pump. As such, normalizing data/signals from a vibration sensor can include removing, canceling, attenuating, or otherwise accounting for the contribution to the frequency spectrum of vibrations that is provided due to the operating frequency of the pump or other piece of equipment. In some cases, this can include dropping or otherwise not using vibration at or near the operating speed of the pump or other equipment. In some cases, this can include dropping or otherwise not using vibration in a band encompassing the operating speed of the pump or other equipment. In some cases, this can include dropping or otherwise not using vibration in a series of bands encompassing the operating speed of the pump or other equipment and at other frequencies representing harmonic frequencies of the operating speed of the pump or other equipment.

It will be appreciated that, in some cases, the operating speed of pumps or other equipment may change. Thus, in some embodiments, the frequency, frequencies, or frequency ranges, that are removed, canceled, attenuated, or otherwise accounted for can be dynamic. In some embodiments, the monitoring system can receive a signal as an input that is indicative of the operating speed of the pump or other equipment and then that frequency or frequency range can be targeted for removal, cancellation, attenuation, or other accounting.

In some embodiments, the monitoring system itself can calculate an operating speed of a pump or other equipment by evaluating a signal input. For example, a flow sensor here can produce a signal that can be evaluated to derive the operating speed of a pump.

In some embodiments, the range of operating speeds of the pump or other equipment can be programmed into the monitoring system and can be used to identify signal frequencies resulting from a pump or other equipment. For example, a given hydraulic pump may have an operating speed range of 85 Hz to 300 Hz. This information can be input into the monitoring system and stored in memory thereof. In operation, the monitoring system evaluate detected vibration in the operating speed range of 85 Hz to 300 Hz. If significant vibrations are detected within that frequency range at a particular frequency, then it can be determined that the pump or other equipment is currently operating at that frequency and that frequency can be targeted for removal, cancellation, attenuation, or other accounting.

Calculation of aeration parameters herein can be performed in various ways. As shown below in the first example, in some cases, aeration (particularly free-air aeration) has a linear relationship with the magnitude of vibration at the dominant frequency. As such, in some cases, calculating aeration can include identifying the dominant frequency, solving the equation x=(y−b)/m wherein x is aeration (free air) percentage, y is the magnitude of vibration at the dominant frequency (e.g., the frequency with the highest magnitude), and m is the slope of the linear relationship between vibration magnitude and aeration percentage. In some embodiments, y as a magnitude can be measured as a root mean square acceleration value or "$G_{RMS}$", which is the square root of the area under the acceleration spectral density (ASD) ($G^2$/Hz) vs. frequency curve (Hz).

In some cases, the equation for calculating aeration based on frequency can take into account more parameters than just magnitude of vibration at a dominant frequency. By way of example, as shown below in the example, there can be a relationship between the bandwidth of vibration response and the degree of aeration. As such, in some embodiments, the bandwidth of vibration response can be used to determine aeration percentage and/or other aeration parameters. In some embodiments, relevant bandwidth can be determined as the band encompassing frequencies having a magnitude of at least a given percentage of the magnitude of the dominant frequency (e.g., the frequency with the highest magnitude). The given percentage can vary, but in some embodiments can be 40, 50, 60, 70, 80, 90, or 95 percent, or an amount falling within a range between any of the foregoing.

In some embodiments, a regression equation can be derived by evaluating empirical data (such as accelerometer signals) gathered with a particular type of equipment. For example, in one operation of a method herein one or more vibration signals can be obtained and recorded including one or more spatial components. In one example, 1, 2, or 3 vibration signals can be obtained, however, various other numbers of vibration signals could be used including 4, 5, 6, 7, 8, 9, 10, or more, or a number falling within a range between any of the foregoing. Various numbers of spatial components of the vibration signals can be obtained, recorded, and/or evaluated. In some embodiments, the spatial components of the vibration signals can include one or more of front-back, left-right, and vertical (such as with respect to a vehicle, or a component thereof such as a pump), such as may be obtained from a three-axis accelerometer. However, in some embodiments, single-axis or double-axis accelerometers can be used.

In another operation of a method herein, time frequency analysis can be performed can be performed on obtained vibration signals (in some cases multidimensional vibration signals).

In another operation of a method herein, features can be extracted out of a time frequency signal (such as a multidimensional time frequency signal). Various signal features can be extracted including, but not limited to, centroid, spread, brightness, high-frequency content, crest, decrease, entropy, flatness, irregularity, kurtosis, skewness, roll-off, flux, variation and the like. Operations to extract features can be performed using a control circuit or components thereof such as a microprocessor, a microcontroller, a FPGA (field programmable gate array) chip, an application specific integrated circuit (ASIC), one or more digital signal processing chips, or the like. In some embodiments, feature extraction can be performed using processing resources associated with a system or device herein. However, in some embodiments, signals and/or data derived from the same can be exported to an external or separate device for feature extraction.

The centroid feature value can be calculated in various ways. In some particular embodiments, the centroid value can be calculated according to the following equation:

$$C(t) = \frac{\Sigma_f w(f) f X(f, t)}{\Sigma_f w(f) X(f)}$$

The centroid feature value can be calculated in various ways. In some embodiments, the spread feature value can be calculated according to the following equation:

$$S(t) = \sqrt{\frac{\Sigma_f (f - C(t)) 2 w(f) X(f)}{\Sigma_f w(f) X(f)}}$$

wherein, for the equations above, X(t,f)=signal, t=time, f=frequency, and w=weighting.

In another operation, values obtained above can be used to derive an aeration predictive regression equation. One example of an aeration predictive regression equation can take the form:

Aeration=$b$*Spectral Feature−$a$

It will be appreciated that specific values for b and a can vary based on the system and the particular spectral feature being utilized. However, in various embodiments the spectral feature is the centroid and "b" can be from about 0.0001 to about 0.010 and "a" can be from about 0 to 100. For example, b can take on values of about 0.0001, 0.0005, 0.001, 0.005, 0.010, or can be a value falling within a range between any of the foregoing numbers. In some embodiments, a can take on values of about 0, 0.01, 0.05, 0.1, 0.5, 1, 2, 3, 4, 5, 7.5, 10, 15, 20, 25, 30, 40, 50, 60, 70, 80, 90, or 100, or can be a value falling within a range between any of the foregoing numbers.

In some embodiments, machine learning algorithms can be used to derive a relationship between vibration and aeration parameters and/or an equation or model defining the same. Machine learning algorithms used herein can include, but are not limited to, supervised learning and unsupervised learning algorithms.

Machine learning algorithms used herein can include, but are not limited to, classification algorithms (supervised algorithms predicting categorical labels), clustering algorithms (unsupervised algorithms predicting categorical labels), ensemble learning algorithms (supervised meta-algorithms for combining multiple learning algorithms together), general algorithms for predicting arbitrarily-structured sets of labels, multilinear subspace learning algorithms (predicting labels of multidimensional data using tensor representations), real-valued sequence labeling algorithms (predicting sequences of real-valued labels), regression algorithms (predicting real-valued labels), and sequence labeling algorithms (predicting sequences of categorical labels).

Machine learning algorithms herein can also include parametric algorithms (such as linear discriminant analysis, quadratic discriminant analysis, and maximum entropy classifier) and nonparametric algorithms (such as decision trees, kernel estimation, naïve Bayes classifier, neural networks, perceptrons, and support vector machines). Clustering algorithms herein can include categorical mixture models, deep learning methods, hierarchical clustering, K-means clustering, correlation clustering, and kernel principal component analysis. Ensemble learning algorithms herein can include boosting, bootstrap aggregating, ensemble averaging, and mixture of experts. General algorithms for predicting arbitrarily-structured sets of labels herein can include Bayesian networks and Markov random fields. Multilinear subspace learning algorithms herein can include multilinear principal component analysis (MPCA). Real-valued sequence labeling algorithms can include Kalman filters and particle filters. Regression algorithms herein can include both supervised (such as Gaussian process regression, linear regression, neural networks and deep learning methods) and unsupervised (such as independent component analysis and principal components analysis) approaches. Sequence labeling algorithms herein can include both supervised (such as conditional random fields, hidden Markov models, maximum entropy Markov models, and recurrent neural networks) and unsupervised (hidden Markov models and dynamic time warping) approaches.

In various embodiments, control circuit can send a signal or alarm regarding aeration if a predetermined threshold value for aeration has been crossed. The signal can be sent to an ECU (such as through a CANBUS network), a system operator, a work site manager, a fleet maintenance center, a fleet monitoring center, a cloud site, or the like.

In some embodiments, the threshold value can preset to be about 0.25, 0.5, 0.75, 1, 1.25, 1.5, 1.75, 2, 2.25, 2.5, 2.75, 3, 3.25, 3.5, 4, 4.5, or 5 percent aeration, or an amount falling within a range between any of the foregoing. In other embodiments, the threshold value can be input into the system by a user and then stored. In some embodiments, the threshold value can be a rate of change in calculated aeration. In some embodiments, the threshold value can be a total amount of calculated aeration over a defined period of time.

In some cases, it can be helpful to mount a vibration sensor (such as an accelerometer or a microphone) in the monitoring system 106 such that it receives vibrations from the pump or other equipment with minimal diminishment of vibration in terms of frequency range and amplitude. In some embodiments, the vibration sensor can be disposed on or within a pump or other equipment such that vibrations incident upon a contact surface of the pump or other equipment are attenuated by less than 50, 40, 30, 20, or 10 percent as incident upon the vibration sensor.

In various embodiments, the monitoring system 106 can include a power supply circuit 322. In some embodiments, the power supply circuit 322 can include various components including, but not limited to, a battery 324, a capacitor, a power-receiver such as a wireless power receiver, a transformer, a rectifier, and the like.

In various embodiments the monitoring system 106 can include an output device 326. The output device 326 can include various components for visual and/or audio output including, but not limited to, lights (such as LED lights), a display screen, a speaker, and the like. In some embodiments, the output device can be used to provide notifications or alerts to a system user such as current system status, an indication of a problem, a required user intervention, a proper time to perform a maintenance action, or the like.

In various embodiments the monitoring system 106 can include memory 328 and/or a memory controller. The memory can include various types of memory components including dynamic RAM (D-RAM), read only memory (ROM), static RAM (S-RAM), disk storage, flash memory, EEPROM, battery-backed RAM such as S-RAM or D-RAM and any other type of digital data storage component. In some embodiments, the electronic circuit or electronic component includes volatile memory. In some embodiments, the electronic circuit or electronic component includes non-volatile memory. In some embodiments, the electronic circuit or electronic component can include transistors interconnected to provide positive feedback operating as latches or flip flops, providing for circuits that have two or more metastable states, and remain in one of these states until changed by an external input. Data storage can be based on such flip-flop containing circuits. Data storage can also be based on the storage of charge in a capacitor or on other principles. In some embodiments, the non-volatile memory 328 can be integrated with the control circuit 304.

In various embodiments the monitoring system 106 can include a clock circuit 330. In some embodiments, the clock circuit 330 can be integrated with the control circuit 304. While not shown in FIG. 3, it will be appreciated that various embodiments herein can include a data/communication bus to provide for the transportation of data between components such as an I$^2$C, a serial peripheral interface (SPI), a universal asynchronous receiver/transmitter (UART), or the like. In some embodiments, an analog signal interface can be included. In some embodiments, a digital signal interface can be included.

In various embodiment the monitoring system 106 can include a communications circuit 332. In various embodiments, the communications circuit can include components such as an antenna 334, amplifiers, filters, digital to analog and/or analog to digital converters, and the like. In some embodiments, the monitoring system 106 can also include wired input/out interface 336 for wired communication with other systems/components including, but not limited to a vehicle ECU, a CANBUS network (controller area network), or the like.

Figure 4:
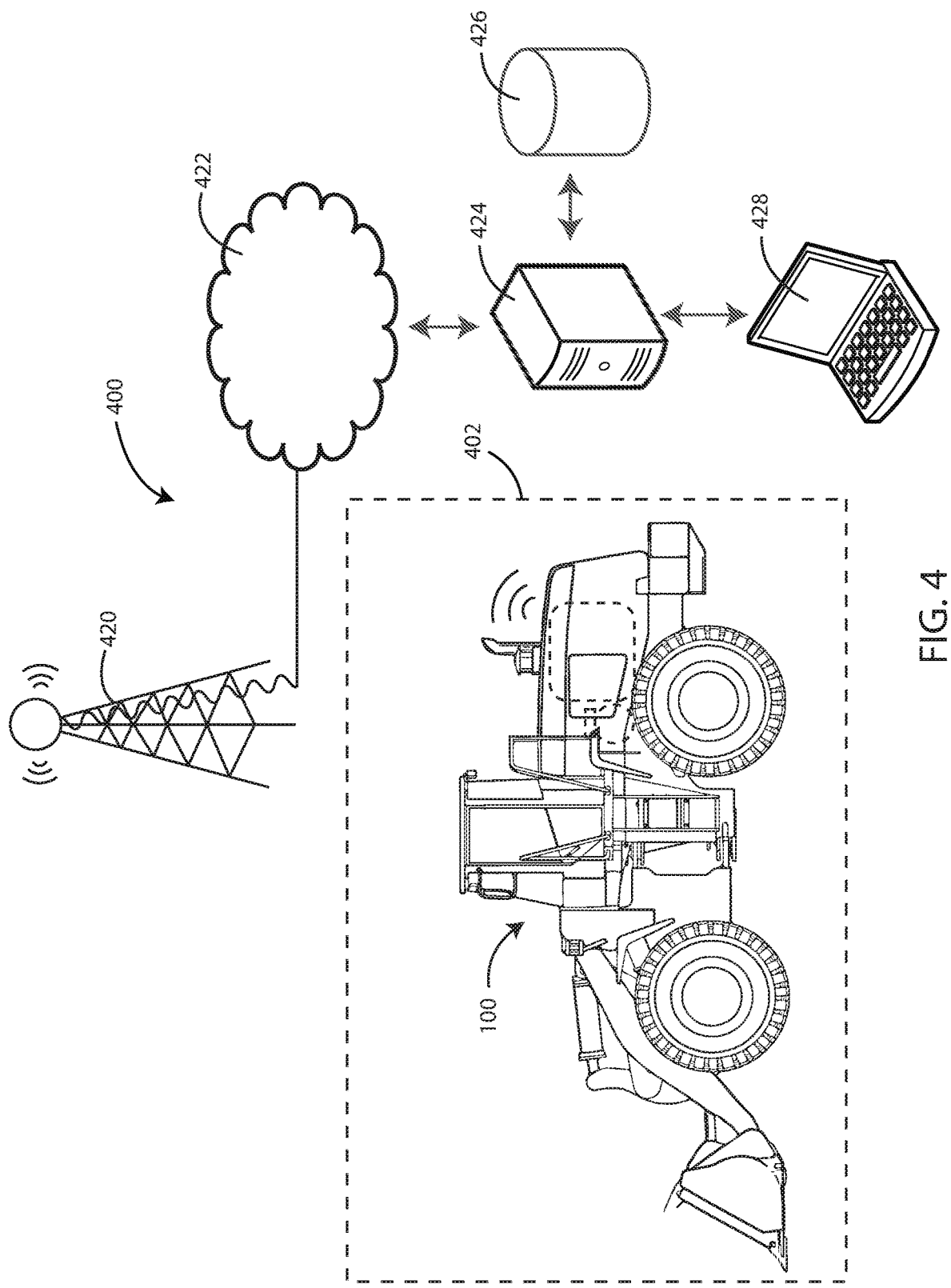
FIG. 4 is a schematic view of a filtration system data communication environment in accordance with various embodiments herein.

Referring now to FIG. 4, a schematic view is shown of a filtration system data communication environment 400 in accordance with various embodiments herein. The data communication environment 400 can include a heavy equipment piece 100, such as a wheel loader including a hydraulic system. In some embodiments, the heavy equipment piece 100 can be within a work environment 402. The work environment 402 can represent a geographic area in which the heavy equipment piece 100 operates. The work environment 402 can be, for example, a work site, a work yard, a mine, shipping or distribution center, a manufacturing facility, a material storage site, a dump, or the like.

In some embodiments, wireless signals from the heavy equipment piece 100 can be exchanged with a wireless communication tower 420 (or antenna array), which could be a cellular tower or other wireless communication tower. The wireless communication tower 420 can be connected to a data network 422, such as the Internet or another type of public or private data network, packet-switched or otherwise.

The data network can provide for one-way or two-way communication with other components that are external to the work environment 402. For example, a server 424 or other processing device can receive electronic signals containing data from one or more components such as the heavy equipment piece 100. The server 424 can interface with a database 426 to store data. In some embodiments, the server 424 (or a device that is part of the server system) can interface with a user device 428, which can allow a user to query data stored in the database 426. The server 424 and/or the database 426 can be at a distinct physical location or can be in the cloud.

Methods

Many different methods are contemplated herein, including, but not limited to, methods of making, methods of using, and the like. Aspects of system/device operation described elsewhere herein can be performed as operations of one or more methods in accordance with various embodiments herein.

Figure 5:
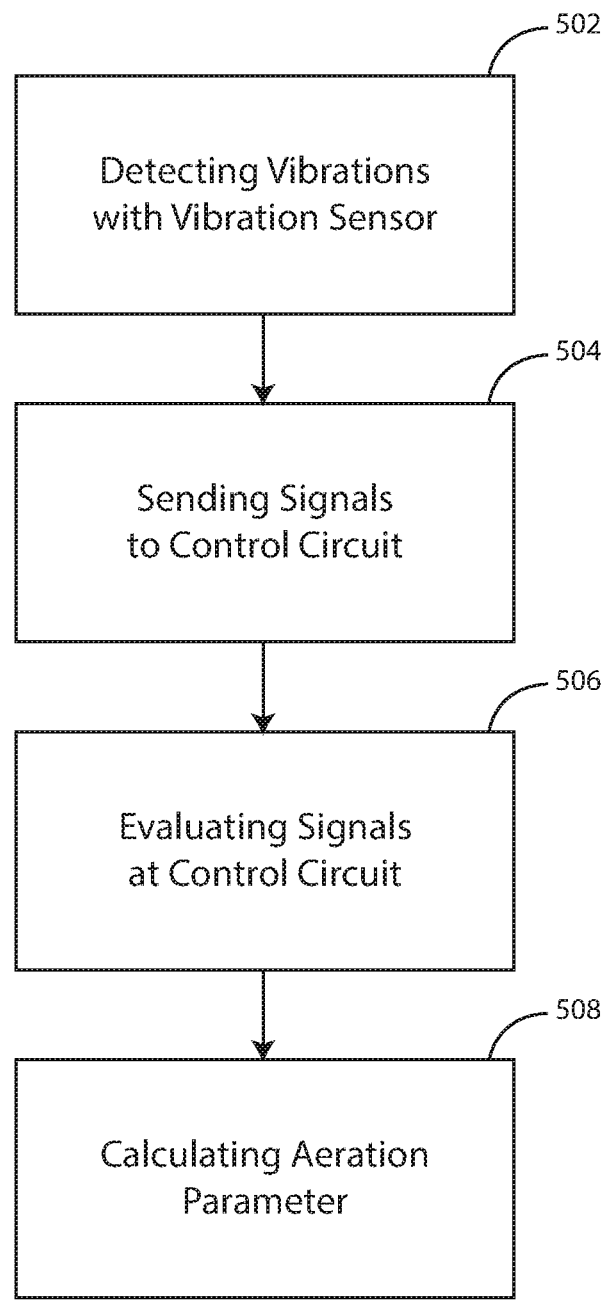
FIG. 5 is a flow chart of a method in accordance with various embodiments herein.

Referring now to FIG. 5, a flow chart of a method is shown in accordance with various embodiments herein. In an embodiment, a method of determining aeration of a fluid in a fluid flow path can include detecting 502 vibrations with a vibration sensor mounted along the fluid flow path. The method can also include sending 504 signals from the vibration sensor to a control circuit. The method can also include evaluating 506 signals received at the control circuit from the vibration sensor to determine frequencies of vibration and magnitudes of vibration at particular frequencies. The method can also include calculating 508 one or more aeration parameters based on the frequencies and magnitudes of vibration.

In various embodiments, the aeration parameters can include at least one of an aeration amount, an aeration percentage, a size of air bubbles, a size classification of air bubbles. By way of example, in some contexts bubbles having a size up to 250 µm can be classified as "fine" in size and, based on size, are likely to have been generated by nucleation from dissolved air. Bubbles having a size greater than 200-250 µm can be classified as "coarse" in size and, based on size, are likely to have been generated from a type of air leak/injection and/or a suction leak on a pump and/or poor tank design (waterfall effect). As such, size classification has diagnostic value. The specific size referenced above are only provided by way of example and it will be appreciated that a threshold value can be set for size classification that is appropriate to the circumstances such as 50, 100, 150, 200, 250, 300, 350, 400, 500, 750, or 1000 µm or a value falling within a range between any of the foregoing. In some embodiments, more than one threshold value for size classification can be used (e.g., there can be more than two size categories). In various embodiment herein, an aeration parameter that can be calculated can include an average size of air bubbles along with a percentage or ratio of air bubbles falling into different size categories, such as those qualifying as "fine" vs. those qualifying as coarse.

In various embodiments, the method can further include normalizing the vibration sensor signals based on a pump operating speed. Aspect of normalization are described in greater detail above.

In various embodiments, the method can further include sending a signal regarding aeration when the calculated aeration crosses a predetermined threshold value. By way of example, the signal can be sent to at least one of an ECU and a system operator.

In an embodiment, the method can further include sending a signal regarding aeration when a rate of change in calculated aeration crosses a predetermined threshold value. In an embodiment, the method can further include sending a signal regarding aeration when a total amount of calculated aeration over a defined period of time crosses a predetermined threshold value. This approach can be useful to screen out what may only be very transitory episodes of aeration. The defined period of time can vary. In some embodiments, the defined period of time can be about 30 seconds, 1 minute, 5 minutes, 10 minutes, 20 minutes, 30 minutes, 1 hour, 3 hours, 12 hours, 24 hours, 48 hours, and the like, or a period of time falling within a range between any of the foregoing.

Figure 6:
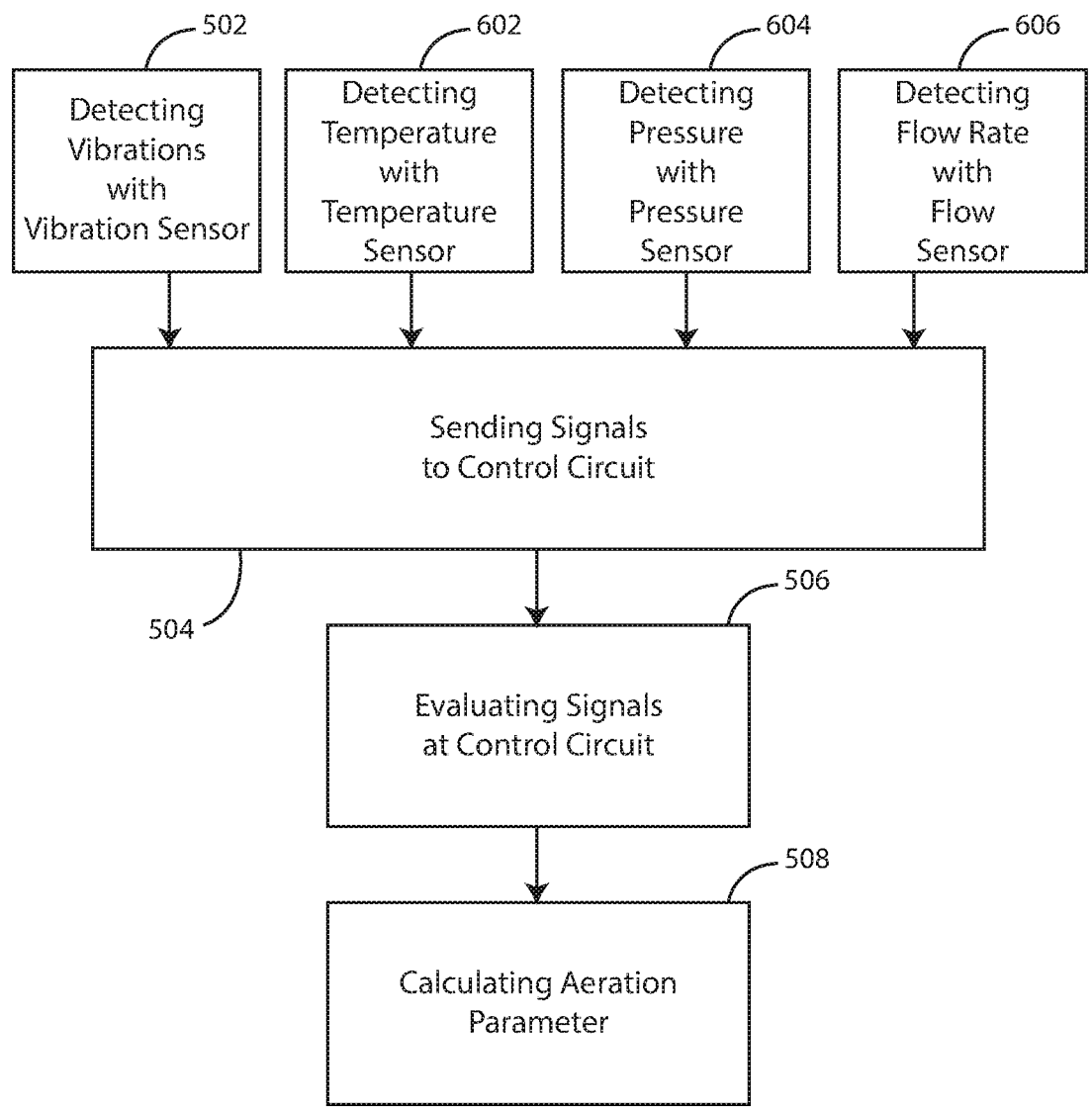
FIG. 6 is a flow chart of a method in accordance with various embodiments herein.

Referring now to FIG. 6, a flow chart of a method is shown in accordance with various embodiments herein. FIG. 6 is generally similar to FIG. 5, however in the embodiment illustrated in FIG. 6 the input from other sensors is also used. In an embodiment, a method can further include sensing a temperature 602 of a fluid within the fluid flow path with a temperature sensor. In an embodiment, the method can further include evaluating a signal received from the temperature sensor and calculating one or more aeration parameters based on the signals received from the temperature sensor along with the signal received from the vibration sensor.

In an embodiment, the method can further include sensing a pressure 604 of a fluid within the fluid flow path with a pressure sensor. In an embodiment, the method can further include evaluating a signal received from the pressure sensor and calculating one or more aeration parameters based on the signals received from the pressure sensor along with the signal received from the vibration sensor.

In an embodiment, the method can further include sensing a flow rate 606 of a fluid within the fluid flow path with a flow sensor. In an embodiment, the method can further include evaluating a signal received from the flow sensor and calculating one or more aeration parameters based on the signals received from the flow sensor along with the signal received from the vibration sensor.

Aspects may be better understood with reference to the following examples. These examples are intended to be representative of specific embodiments, but are not intended as limiting the overall scope of embodiments herein.

EXAMPLES

Example 1: Detection of Aeration in a Hydraulic Line of a Piece of Mobile Equipment A 3-axis accelerometer was mounted on a hydraulic pump housing of a piece of equipment (CNH Wheel Loader 1021G). An air line was connected to the hydraulic line upstream from the hydraulic pump. Definitive measurements of free-air aeration were provided by using an AIR-X sensor from Delta Services Industriels in Froyennes, Belgium. Aeration was measured with a sample pump pulling from the inlet/suction side of the fan/brake pump. Air was injected upstream of the hydraulic pump at 0.5 LPM at 100 PSI for 9:35 (m:ss), after warming the oil to 50° C. The vehicle was stationary but was raising and lowering bucket implement throughout.

Different quantities of air were then injected into the hydraulic line, the amount of free-air aeration was determined with the AIR-X sensor (wherein 0% is no free air) and the vibrations from the accelerometer were recorded and evaluated. The accelerometer was operating at a sampling rate of 20,000 Hz, while the x-ray attenuation device was operating at a sample rate of 0.1 Hz. Therefore, accelerometer data was averaged across 10 seconds to match the sampling rate of the x-ray attenuation device.

Figure 7:
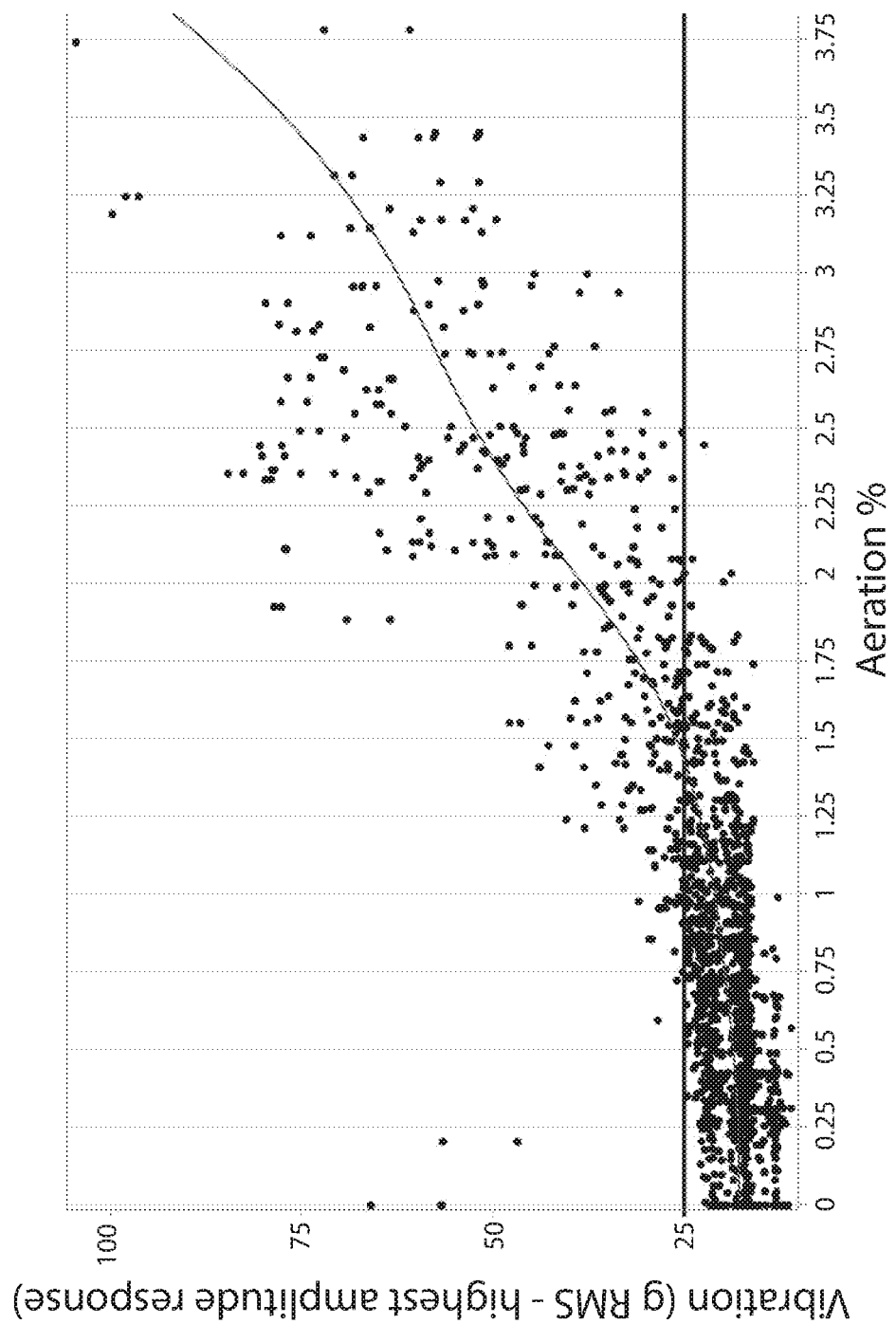
FIG. 7 is a graph of free-air aeration vs. detected vibration.

FIG. 7 is a graph of free-air aeration vs. detected vibration as measured in a wheel loader. In FIG. 7, 0% represents no free air aeration. It was found that changes in vibration were minimal up to a free-air aeration of approximately 1.4% in this application. Above that level, vibration had a linear relationship with free-air aeration (correlation coefficient of 0.55) allowing for a calculation of free-air aeration percentage. This example shows that aeration parameters can be calculated based on a vibration sensor signal.

Since the hydraulic fluids in this example were not degassed it can be assumed that the total dissolved air was approximately at the solubility limit for the pressure of the fluid in the line at the point that aeration was measured. Since total aeration is the sum of dissolved air and free-air aeration, total aeration can be measured based on evaluation of vibration sensor signals by adding in a dissolved air portion either treating it as a constant amount or as an amount adjusted based on a determined solubility limit.

Figure 8:
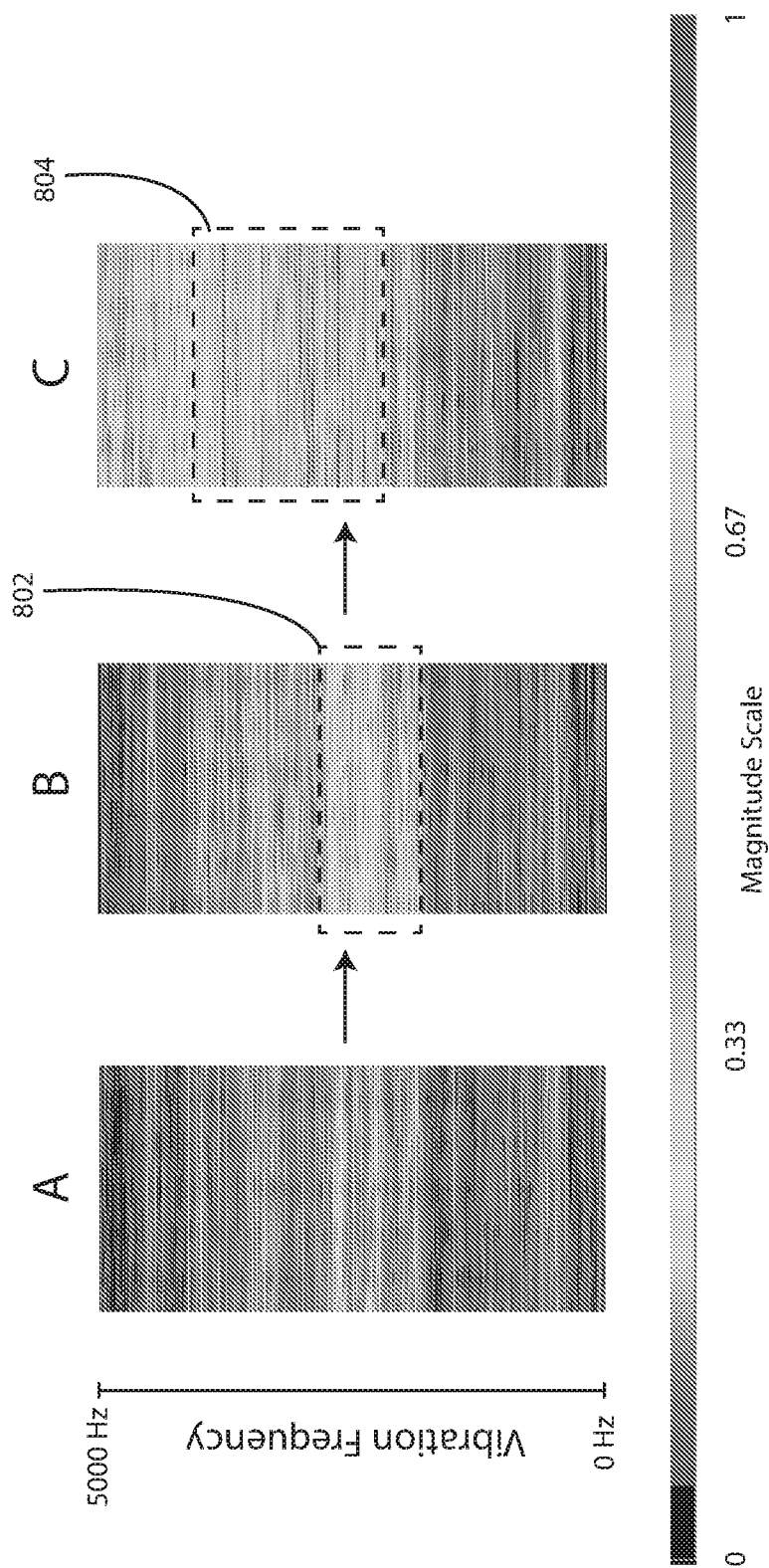
FIG. 8 is a graph showing the prevalence of vibration at different frequencies in response to aeration.

Detected vibration was further analyzed based on frequency in a different machine. FIG. 8 is a graph showing the prevalence of vibration at different time points across a frequency range of 0 to 5000 Hz in response to aeration as measured in a skid steer (CAT 272D SSL with a mulcher implement). Time "A" is before the injection of air began and represents normal operating vibration frequencies of the hydraulic pump. Time "B" is during air injection wherein aeration was climbing and at a moderate degree of aeration (0.4%) (0.25 CFH at 95 PSI downstream of charge pump inlet). Time "C" is during air injection when the volume of air was increased and the aeration is at a high degree (4.1%).

As can be seen, at time "A", vibration at all frequencies is relatively low, with some vibration being detected at around 85 Hz, which was the operating speed of the pump. At time "B", the magnitude of vibration showed notable increases in a particular range 802. At time "C", the magnitude of vibration increased substantially compared with time "B" showing substantial intensity across range 804. Range 804 is broader than range 802 in breadth and magnitude and also slightly higher frequencies.

This example shows that vibration range breadth and magnitude varies with the degree of aeration and that parameters of detected vibration including, but not limited to, range and magnitude can be used to calculate aeration parameters herein.

Example 2: Extraction of Features from Multidimensional Time Frequency Signal and Building Aeration Predictive Equation A 3-axis accelerometer was mounted on each hydraulic pump housing (charge pump, implement pump, and transmission pump in hydraulic circuit) of a CAT 272D SSL with a mulcher implement. Vibrations from the accelerometer were recorded and evaluated. The accelerometer was operating at a sampling rate of 20,000 Hz. Definitive measurements of free-air aeration were provided by using an AIR-X sensor from Delta Services Industriels in Froyennes, Belgium, using a sample pump pulling from the charge pump inlet/suction.

In a first test scenario, with the skid steer stationary, a minimal tank volume of hydraulic fluid was used and then the tank was almost fully drained by lifting the implement extremely high with the mulcher running, causing significant aeration.

Figure 9:
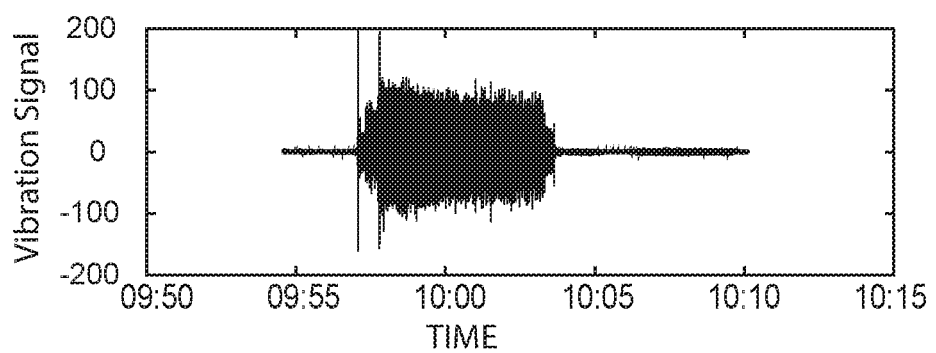
FIG. 9 is a graph showing a vibration signal over time.
Figure 10:
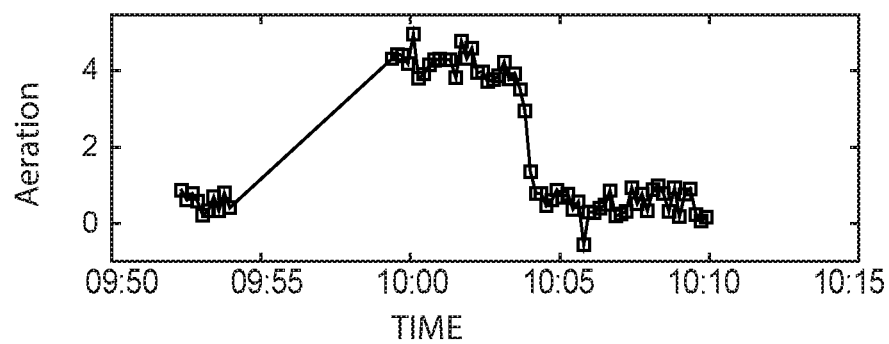
FIG. 10 is a graph showing aeration over time.
Figure 11:
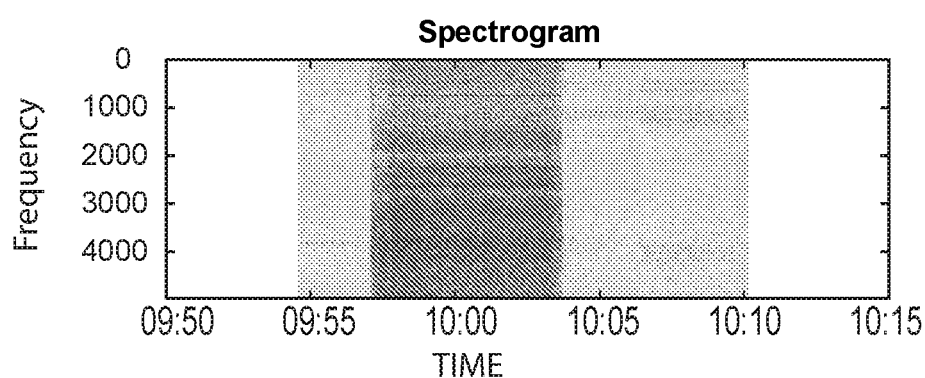
FIG. 11 is a graph showing spectrogram frequency over time.
Figure 12:
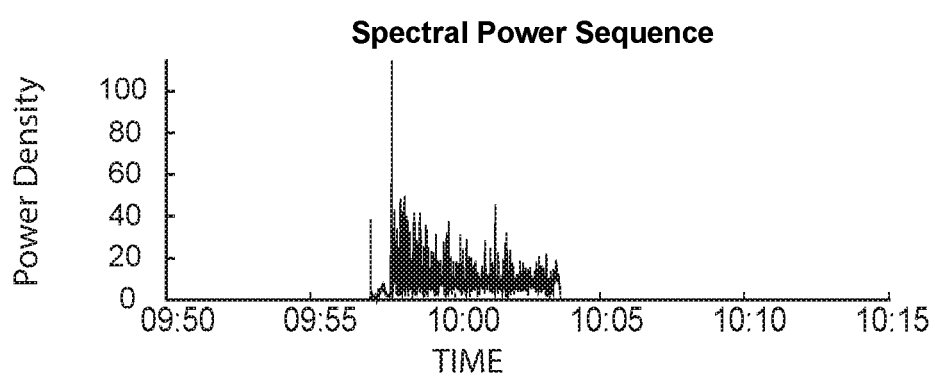
FIG. 12 is a graph showing power density over time.

FIG. 9 is a graph showing a vibration signal over time for the vertical component of the vibration signal from the accelerometer mounted on the implement pump. FIG. 10 is a graph showing aeration (%) over time as determined using the x-ray attenuation density measurement machine (e.g., taken as a definitive measure of actual aeration). FIG. 11 is a graph showing spectrogram frequency (Hz) over time for the vibration signal. FIG. 12 is a graph showing power density over time for the vibration signal.

Figure 13:
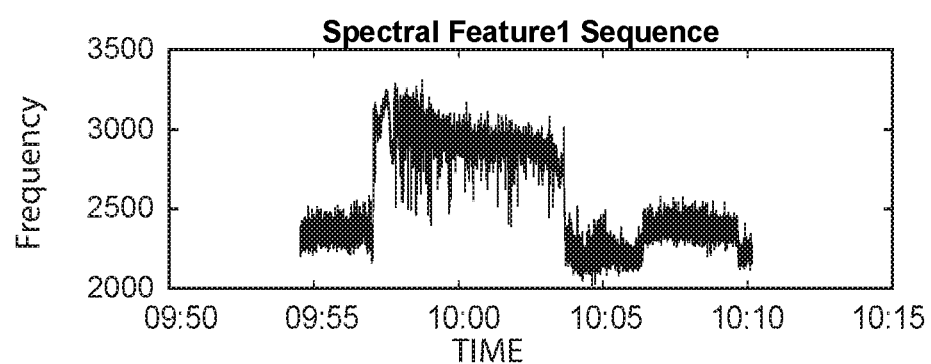
FIG. 13 is a graph showing frequency over time of a particular spectral feature.
Figure 14:
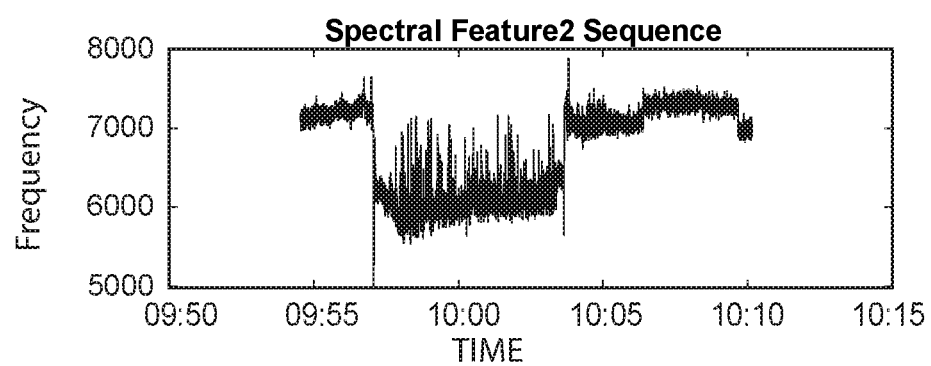
FIG. 14 is a graph showing frequency over time of a particular spectral feature.

Signal features were then extracted from the vibration signal. In particular, a centroid feature was extracted. FIG. 13 shows a graph showing frequency (Hz) over time of the extracted centroid feature. FIG. 14 is a graph showing frequency (Hz) over time of the centroid feature.

The extracted centroid feature and actual aeration values were then used in a regression analysis to determine a regression equation that could be used to estimate aeration. The determined equation is was as follows:

$$\text{Aeration} = 0.0054 * \text{Spectral Feature 1} - 11.74$$

Figure 15:
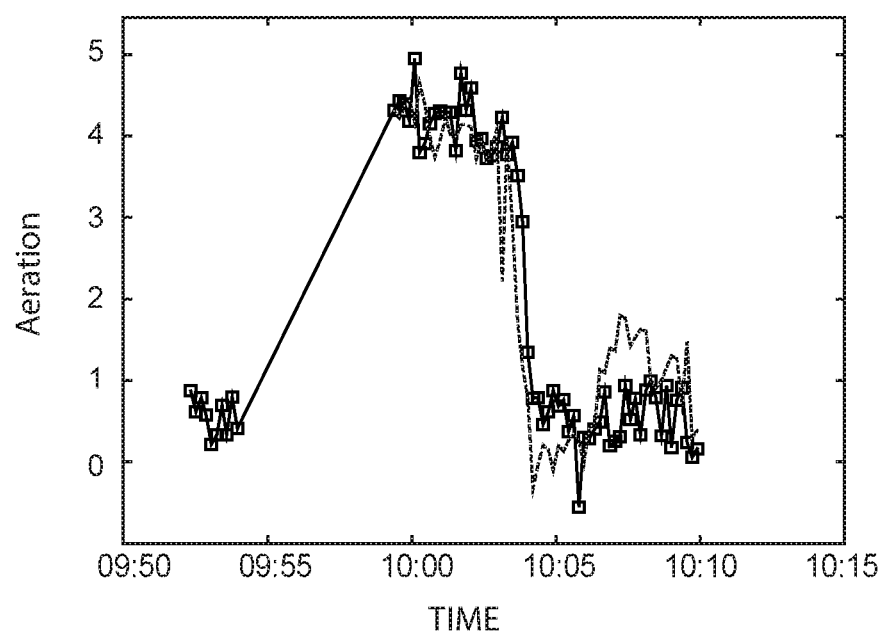
FIG. 15 is a graph showing aeration over time vs. estimated aeration over time.

FIG. 15 is a graph showing actual aeration (%) over time (solid line) versus estimated aeration using the centroid feature and the determined equation (dotted line). The close correlation between the two lines shows that this technique can be used to accurately estimate aeration.

Figure 16:
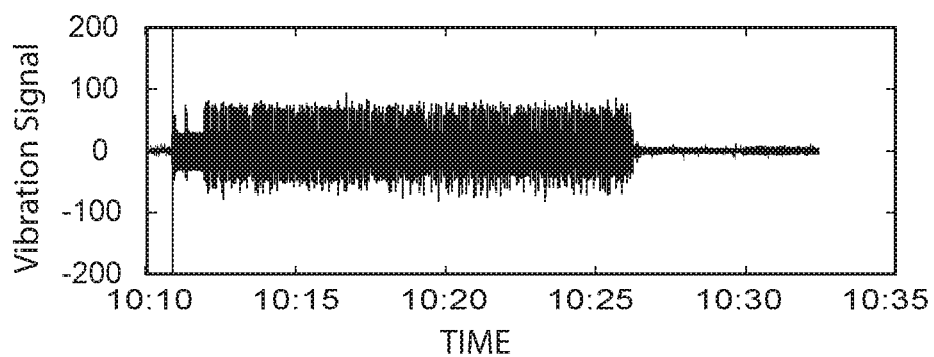
FIG. 16 is a graph showing a vibration signal over time.
Figure 17:
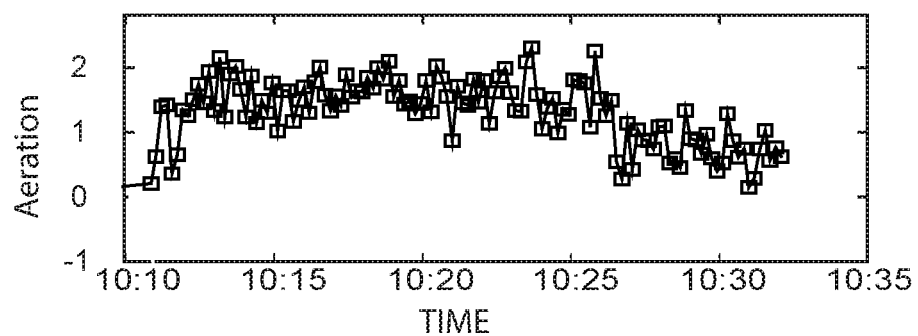
FIG. 17 is a graph showing aeration over time.
Figure 18:
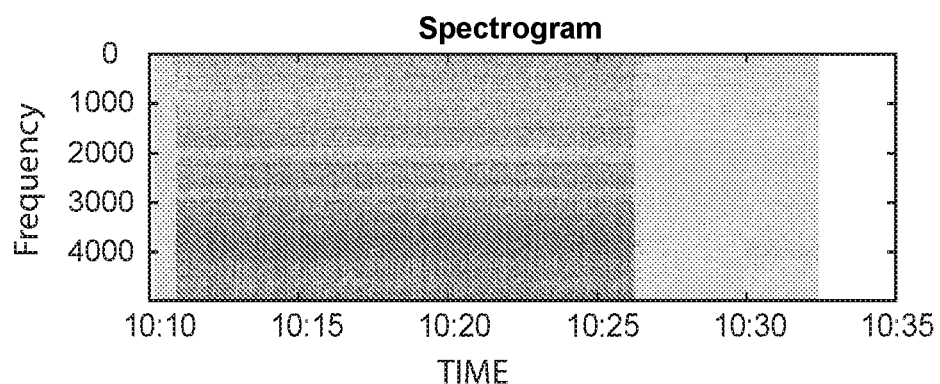
FIG. 18 is a graph showing spectrogram frequency over time.
Figure 19:
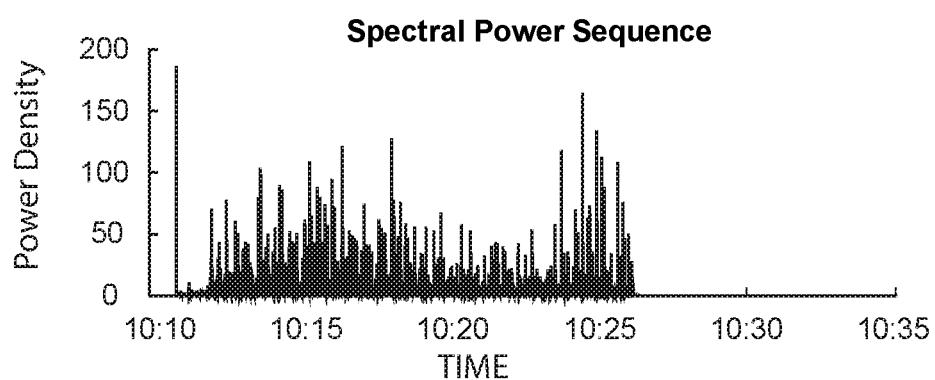
FIG. 19 is a graph showing power density over time.

In a second test scenario, the CAT 272D SSL with mulcher implement was driven backwards and forwards and small lifts of the implement were performed causing aeration with the mulcher running. A similar procedure to that described for the first test scenario was then repeated. As such, FIG. 16 is a graph showing a vibration signal over time for the vertical component of the vibration signal from the accelerometer mounted on the implement pump. FIG. 17 is a graph showing aeration (%) over time as determined using the x-ray attenuation density measurement machine (e.g., taken as a definitive measure of actual aeration). FIG. 18 is a graph showing spectrogram frequency (Hz) over time for the vibration signal. FIG. 19 is a graph showing power density over time for the vibration signal.

Figure 20:
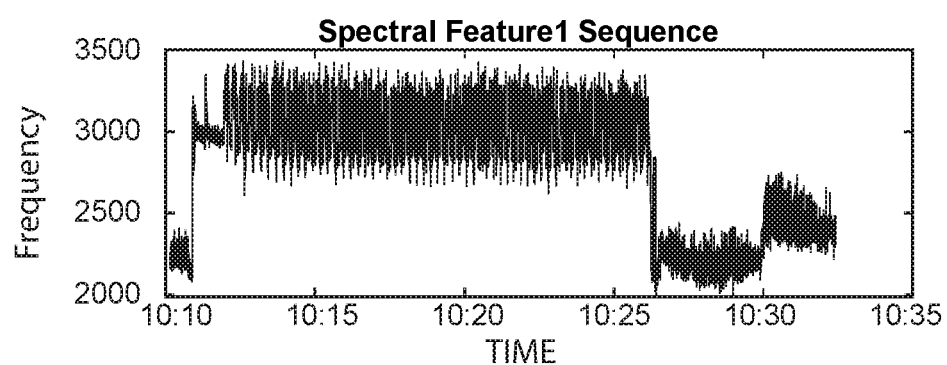
FIG. 20 is a graph showing frequency over time of a particular spectral feature.
Figure 21:
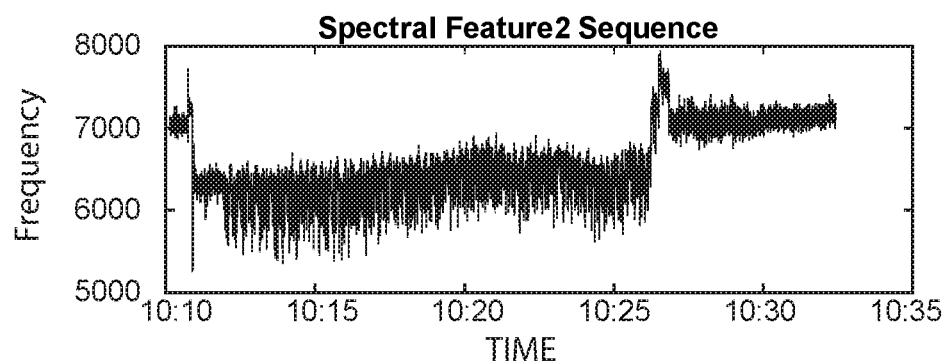
FIG. 21 is a graph showing frequency over time of a particular spectral feature.

Signal features were then extracted from the vibration signal. In particular, a centroid feature was extracted. FIG. 20 shows a graph showing frequency (Hz) over time of the extracted centroid feature. FIG. 21 is a graph showing frequency (Hz) over time of the centroid feature.

The extracted centroid feature and actual aeration values were then used in a regression analysis to determine a regression equation that could be used to estimate aeration. The determined equation is was as follows:

Aeration=0.0009*Spectral Feature 1−1.22

Figure 22:
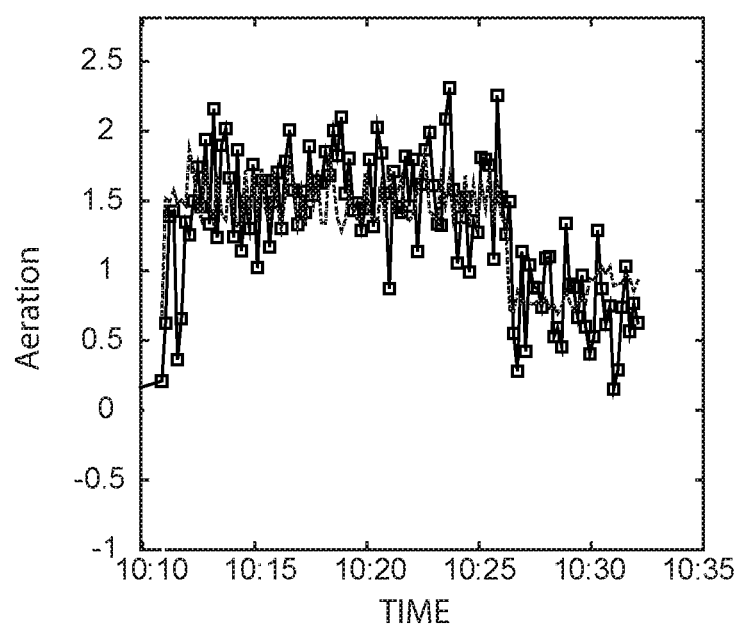
FIG. 22 is a graph showing aeration over time vs. estimated aeration over time.

FIG. 22 is a graph showing aeration percent (solid line) over time vs. estimated aeration (dotted line) using the regression equation over time. The close correlation between the two lines shows that this technique can be used to accurately estimate aeration even in the context of devices/vehicles that are in motion.

Further Embodiments

In a first aspect, a system for fluid aeration monitoring is included having a vibration sensor configured to be mounted along a fluid flow path, and a control circuit in signal communication with the vibration sensor. The control circuit can be configured to evaluate a signal received from the vibration sensor to determine frequencies of vibration and magnitudes of vibration at particular frequencies. The control circuit can be further configured to calculate one or more aeration parameters based on the frequencies and magnitudes of vibration.

In a second aspect, in addition to one or more of the preceding or following aspects, or in the alternative to some aspects, the vibration sensor can include at least one of an accelerometer and an acoustical transducer.

In a third aspect, in addition to one or more of the preceding or following aspects, or in the alternative to some aspects, the vibration sensor can include an accelerometer that measures in at least one axis.

In a fourth aspect, in addition to one or more of the preceding or following aspects, or in the alternative to some aspects, the control circuit can be configured to send a signal regarding aeration when a calculated aeration crosses a predetermined threshold value.

In a fifth aspect, in addition to one or more of the preceding or following aspects, or in the alternative to some aspects, wherein the signal is sent to at least one of an ECU and a system operator.

In a sixth aspect, in addition to one or more of the preceding or following aspects, or in the alternative to some aspects, the control circuit can be configured to send a signal regarding aeration when a rate of change in calculated aeration crosses a predetermined threshold value.

In a seventh aspect, in addition to one or more of the preceding or following aspects, or in the alternative to some aspects, the control circuit can be configured to send a signal regarding aeration when a total amount of calculated aeration over a defined period of time crosses a predetermined threshold value.

In an eighth aspect, in addition to one or more of the preceding or following aspects, or in the alternative to some aspects, the fluid flow path can include a pump and the vibration sensor is configured to be mounted on or in the pump.

In a ninth aspect, in addition to one or more of the preceding or following aspects, or in the alternative to some aspects, the control circuit can be further configured to normalize vibration sensor signals based on an operating speed of the pump.

In a tenth aspect, in addition to one or more of the preceding or following aspects, or in the alternative to some aspects, the fluid flow path can include a filter housing and the vibration sensor is configured to be mounted on or in the filter housing.

In an eleventh aspect, in addition to one or more of the preceding or following aspects, or in the alternative to some aspects, the vibration sensor can include an accelerometer and the vibration sensor is positioned so that at least one axis of sensitivity is aligned with an axis of movement of a component of a pump.

In a twelfth aspect, in addition to one or more of the preceding or following aspects, or in the alternative to some aspects, the fluid flow path can be selected from the group consisting of a hydraulic fluid conduit, a lubricating oil conduit, a brake fluid conduit, a refrigerant fluid conduit, and a fuel supply conduit.

In a thirteenth aspect, in addition to one or more of the preceding or following aspects, or in the alternative to some aspects, can further include a communications circuit and an antenna.

In a fourteenth aspect, in addition to one or more of the preceding or following aspects, or in the alternative to some aspects, the aeration parameters can include at least one of an aeration amount, an aeration percentage, a size of air bubbles, a size classification of air bubbles.

In a fifteenth aspect, in addition to one or more of the preceding or following aspects, or in the alternative to some aspects, can further include a temperature sensor, the temperature sensor configured to sense a temperature of a fluid within the fluid flow path.

In a sixteenth aspect, in addition to one or more of the preceding or following aspects, or in the alternative to some aspects, the control circuit can be configured to evaluate a signal received from the temperature sensor and can further be configured to calculate one or more aeration parameters based on the signals received from the temperature sensor along with the signal received from the vibration sensor.

In a seventeenth aspect, in addition to one or more of the preceding or following aspects, or in the alternative to some aspects, the system can further include a pressure sensor, the pressure sensor configured to sense a pressure of a fluid within the fluid flow path.

In an eighteenth aspect, in addition to one or more of the preceding or following aspects, or in the alternative to some aspects, the control circuit can be configured to evaluate a signal received from the pressure sensor and can further be configured to calculate one or more aeration parameters based on the signals received from the pressure sensor along with the signal received from the vibration sensor.

In a nineteenth aspect, in addition to one or more of the preceding or following aspects, or in the alternative to some aspects, the system can further include a flow sensor, the flow sensor configured to sense a flow rate of a fluid within the fluid flow path.

In a twentieth aspect, in addition to one or more of the preceding or following aspects, or in the alternative to some aspects, wherein the control circuit is configured to evaluate a signal received from the flow sensor and is further configured to calculate one or more aeration parameters based on the signals received from the flow sensor along with the signal received from the vibration sensor.

In a twenty-first aspect, in addition to one or more of the preceding or following aspects, or in the alternative to some aspects, the system or portions thereof can be mounted on or in a piece of mobile equipment having a hydraulic actuator.

In a twenty-second aspect, in addition to one or more of the preceding or following aspects, or in the alternative to some aspects, the system or portions thereof can be mounted on or in a piece of stationary equipment having a hydraulic actuator.

In a twenty-third aspect, a method of determining aeration of a fluid in a fluid flow path is included and can include detecting vibrations with a vibration sensor mounted along the fluid flow path, sending signals from the vibration sensor to a control circuit; evaluating signals received at the control circuit from the vibration sensor to determine frequencies of vibration, and magnitudes of vibration at particular frequencies, and calculating one or more aeration parameters based on the frequencies and magnitudes of vibration.

In a twenty-fourth aspect, in addition to one or more of the preceding or following aspects, or in the alternative to some aspects, a method further can include normalizing the vibration sensor signals based on a pump operating speed.

In a twenty-fifth aspect, in addition to one or more of the preceding or following aspects, or in the alternative to some aspects, the vibration sensor can include at least one of an accelerometer and an acoustical transducer.

In a twenty-sixth aspect, in addition to one or more of the preceding or following aspects, or in the alternative to some aspects, the vibration sensor can include an accelerometer that measures in at least one axis.

In a twenty-seventh aspect, in addition to one or more of the preceding or following aspects, or in the alternative to some aspects, a method further can include sending a signal regarding aeration when a calculated aeration crosses a predetermined threshold value.

In a twenty-eighth aspect, in addition to one or more of the preceding or following aspects, or in the alternative to some aspects, the signal can be sent to at least one of an ECU and a system operator.

In a twenty-ninth aspect, in addition to one or more of the preceding or following aspects, or in the alternative to some aspects, a method further can include sending a signal regarding aeration when a rate of change in calculated aeration crosses a predetermined threshold value.

In a thirtieth aspect, in addition to one or more of the preceding or following aspects, or in the alternative to some aspects, a method further can include sending a signal regarding aeration when a total amount of calculated aeration over a defined period of time crosses a predetermined threshold value.

In a thirty-first aspect, in addition to one or more of the preceding or following aspects, or in the alternative to some aspects, the fluid flow path can include a pump and the vibration sensor is configured to be mounted on or in the pump.

In a thirty-second aspect, in addition to one or more of the preceding or following aspects, or in the alternative to some aspects, the fluid flow path can include a filter housing and the vibration sensor is configured to be mounted on or in the filter housing.

In a thirty-third aspect, in addition to one or more of the preceding or following aspects, or in the alternative to some aspects, the vibration sensor can include an accelerometer and the vibration sensor is positioned so that at least one axis of sensitivity is aligned with an axis of movement of a component of a pump.

In a thirty-fourth aspect, in addition to one or more of the preceding or following aspects, or in the alternative to some aspects, the fluid flow path can be selected from the group consisting of a hydraulic fluid conduit, a lubricating oil conduit, a brake fluid conduit, a refrigerant fluid conduit, and a fuel supply conduit.

In a thirty-fifth aspect, in addition to one or more of the preceding or following aspects, or in the alternative to some aspects, the aeration parameters can include at least one of an aeration amount, an aeration percentage, a size of air bubbles, a size classification of air bubbles.

In a thirty-sixth aspect, in addition to one or more of the preceding or following aspects, or in the alternative to some aspects, a method further can include sensing a temperature of a fluid within the fluid flow path with a temperature sensor.

In a thirty-seventh aspect, in addition to one or more of the preceding or following aspects, or in the alternative to some aspects, a method further can include evaluating a signal received from the temperature sensor and calculating one or more aeration parameters based on the signals received from the temperature sensor along with the signal received from the vibration sensor.

In a thirty-eighth aspect, in addition to one or more of the preceding or following aspects, or in the alternative to some aspects, a method further can include sensing a pressure of a fluid within the fluid flow path with a pressure sensor.

In a thirty-ninth aspect, in addition to one or more of the preceding or following aspects, or in the alternative to some aspects, a method further can include evaluating a signal received from the pressure sensor and calculating one or more aeration parameters based on the signals received from the pressure sensor along with the signal received from the vibration sensor.

In a fortieth aspect, in addition to one or more of the preceding or following aspects, or in the alternative to some aspects, a method further can include sensing a flow rate of a fluid within the fluid flow path with a flow sensor.

In a forty-first aspect, in addition to one or more of the preceding or following aspects, or in the alternative to some aspects, a method further can include evaluating a signal received from the flow sensor and calculating one or more aeration parameters based on the signals received from the flow sensor along with the signal received from the vibration sensor.

In a forty-second aspect, a system for fluid aeration tracking is included having a vibration sensor configured to be mounted along a fluid flow path, wherein the vibration sensor generates a vibration signal, a control circuit in signal communication with the vibration sensor, wherein the control circuit is configured to calculate a feature value of the vibration signal, and estimate a fluid aeration value based on the calculated feature value.

In a forty-third aspect, in addition to one or more of the preceding or following aspects, or in the alternative to some aspects, the feature value includes a centroid value.

In a forty-fourth aspect, in addition to one or more of the preceding or following aspects, or in the alternative to some aspects, the feature value includes a spread value.

In a forty-fifth aspect, in addition to one or more of the preceding or following aspects, or in the alternative to some aspects, the vibration sensor can include at least one of an accelerometer and an acoustical transducer.

In a forty-sixth aspect, in addition to one or more of the preceding or following aspects, or in the alternative to some aspects, the vibration sensor can include an accelerometer that measures in at least one axis.

In a forty-seventh aspect, in addition to one or more of the preceding or following aspects, or in the alternative to some aspects, the control circuit is configured to send a signal regarding aeration when a calculated aeration crosses a predetermined threshold value.

In a forty-eighth aspect, in addition to one or more of the preceding or following aspects, or in the alternative to some aspects, the signal is sent to at least one of an ECU and a system operator.

In a forty-ninth aspect, in addition to one or more of the preceding or following aspects, or in the alternative to some aspects, the control circuit is configured to send a signal regarding aeration when a rate of change in calculated aeration crosses a predetermined threshold value.

In a fiftieth aspect, in addition to one or more of the preceding or following aspects, or in the alternative to some aspects, the control circuit is configured to send a signal regarding aeration when a total amount of calculated aeration over a defined period of time crosses a predetermined threshold value.

In a fifty-first aspect, in addition to one or more of the preceding or following aspects, or in the alternative to some aspects, the fluid flow path includes a pump and the vibration sensor is configured to be mounted on or in the pump.

In a fifty-second aspect, in addition to one or more of the preceding or following aspects, or in the alternative to some aspects, the control circuit is further configured to normalize vibration sensor signals based on an operating speed of the pump.

In a fifty-third aspect, in addition to one or more of the preceding or following aspects, or in the alternative to some aspects, the fluid flow path includes a filter housing and the vibration sensor is configured to be mounted on or in the filter housing.

In a fifty-fourth aspect, in addition to one or more of the preceding or following aspects, or in the alternative to some aspects, the vibration sensor includes an accelerometer and the vibration sensor is positioned so that at least one axis of sensitivity is aligned with an axis of movement of a component of a pump.

In a fifty-fifth aspect, in addition to one or more of the preceding or following aspects, or in the alternative to some aspects, the fluid flow path is selected from the group consisting of a hydraulic fluid conduit, a lubricating oil conduit, a brake fluid conduit, a refrigerant fluid conduit, and a fuel supply conduit.

In a fifty-sixth aspect, in addition to one or more of the preceding or following aspects, or in the alternative to some aspects, the system can include a communications circuit and an antenna.

In a fifty-seventh aspect, in addition to one or more of the preceding or following aspects, or in the alternative to some aspects, the aeration parameters can include at least one of an aeration amount, an aeration percentage, a size of air bubbles, a size classification of air bubbles.

In a fifty-eighth aspect, in addition to one or more of the preceding or following aspects, or in the alternative to some aspects, the system can further include a temperature sensor, the temperature sensor configured to sense a temperature of a fluid within the fluid flow path.

In a fifty-ninth aspect, in addition to one or more of the preceding or following aspects, or in the alternative to some aspects, the control circuit can be configured to evaluate a signal received from the temperature sensor and is further configured to calculate one or more aeration parameters based on the signals received from the temperature sensor along with the signal received from the vibration sensor.

In a sixtieth aspect, in addition to one or more of the preceding or following aspects, or in the alternative to some aspects, the system further can include a pressure sensor, the pressure sensor configured to sense a pressure of a fluid within the fluid flow path.

In a sixty-first aspect, in addition to one or more of the preceding or following aspects, or in the alternative to some aspects, the control circuit can be configured to evaluate a signal received from the pressure sensor and is further configured to calculate one or more aeration parameters based on the signals received from the pressure sensor along with the signal received from the vibration sensor.

In a sixty-second aspect, in addition to one or more of the preceding or following aspects, or in the alternative to some aspects, the system further can include a flow sensor, the flow sensor configured to sense a flow rate of a fluid within the fluid flow path.

In a sixty-third aspect, in addition to one or more of the preceding or following aspects, or in the alternative to some aspects, the control circuit can be configured to evaluate a signal received from the flow sensor and can be further configured to calculate one or more aeration parameters based on the signals received from the flow sensor along with the signal received from the vibration sensor.

In a sixty-fourth aspect, in addition to one or more of the preceding or following aspects, or in the alternative to some aspects, the system can be mounted on or in a piece of mobile equipment having a hydraulic actuator.

In a sixty-fifth aspect, in addition to one or more of the preceding or following aspects, or in the alternative to some aspects, the system can be mounted on or in a piece of stationary equipment having a hydraulic actuator.

In a sixty-sixth aspect, a method of determining aeration of a fluid in a fluid flow path is included. The method can include detecting vibrations with a vibration sensor mounted along the fluid flow path, sending signals from the vibration sensor to a control circuit, processing signals received at the control circuit from the vibration sensor to calculate a feature value of the vibration signal, and estimate a fluid aeration value based on the calculated feature value.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A system for fluid aeration monitoring comprising:
   a vibration sensor configured to be mounted along a fluid flow path;
   a control circuit in signal communication with the vibration sensor;
   wherein the control circuit is configured to evaluate a signal received from the vibration sensor to determine frequencies of vibration; and
   magnitudes of vibration at particular frequencies;
   wherein the control circuit is further configured to calculate one or more aeration parameters based on the frequencies and magnitudes of vibration, the aeration parameters comprising at least one of an aeration amount, an aeration percentage, a size of air bubbles, a size classification of air bubbles.

2. The system of claim 1, wherein the control circuit is configured to send a signal regarding aeration when a rate of change in calculated aeration crosses a predetermined threshold value.

3. The system of claim 1, wherein the control circuit is configured to send a signal regarding aeration when a total amount of calculated aeration over a defined period of time crosses a predetermined threshold value.

4. The system of claim 1, wherein the fluid flow path includes a filter housing and the vibration sensor is configured to be mounted on or in the filter housing.

5. The system of claim 1, wherein the vibration sensor comprises an accelerometer and the vibration sensor is positioned so that at least one axis of sensitivity is aligned with an axis of movement of a component of a pump.

6. The system of claim 1, further comprising a temperature sensor, the temperature sensor configured to sense a temperature of a fluid within the fluid flow path.

7. The system of claim 6, wherein the control circuit is configured to evaluate a signal received from the temperature sensor and is further configured to calculate one or more aeration parameters based on the signals received from the temperature sensor along with the signal received from the vibration sensor.

8. The system of claim 1, further comprising a pressure sensor, the pressure sensor configured to sense a pressure of a fluid within the fluid flow path.

9. The system of claim 8, wherein the control circuit is configured to evaluate a signal received from the pressure sensor and is further configured to calculate one or more aeration parameters based on the signals received from the pressure sensor along with the signal received from the vibration sensor.

10. The system of claim 1, further comprising a flow sensor, the flow sensor configured to sense a flow rate of a fluid within the fluid flow path.

11. The system of claim 10, wherein the control circuit is configured to evaluate a signal received from the flow sensor and is further configured to calculate one or more aeration parameters based on the signals received from the flow sensor along with the signal received from the vibration sensor.

12. A method of determining aeration of a fluid in a fluid flow path comprising
   detecting vibrations with a vibration sensor mounted along the fluid flow path;
   sending signals from the vibration sensor to a control circuit;
   evaluating signals received at the control circuit from the vibration sensor to determine frequencies of vibration; and
   magnitudes of vibration at particular frequencies; and
   calculating one or more aeration parameters based on the frequencies and magnitudes of vibration, the aeration parameters comprising at least one of an aeration amount, an aeration percentage, a size of air bubbles, a size classification of air bubbles.

13. The method of claim 12, further comprising sending a signal regarding aeration when a rate of change in calculated aeration crosses a predetermined threshold value.

14. The method of claim 12, further comprising sending a signal regarding aeration when a total amount of calculated aeration over a defined period of time crosses a predetermined threshold value.

15. The method of claim 12, further comprising sensing a temperature of a fluid within the fluid flow path with a temperature sensor.

16. The method of claim 15, further comprising evaluating a signal received from the temperature sensor and calculating one or more aeration parameters based on the signals received from the temperature sensor along with the signal received from the vibration sensor.

17. A system for fluid aeration tracking comprising: a vibration sensor configured to be mounted along a fluid flow path, wherein the vibration sensor generates a vibration signal; a control circuit in signal communication with the vibration sensor; wherein the control circuit is configured to calculate a feature value of the vibration signal; wherein the feature value comprises a bandwidth of the vibration signal, and wherein the control circuit is configured to calculate an aeration percentage from the bandwidth of the vibration signal.

18. The system of claim 17, wherein the feature value comprises at least one of a centroid value and a spread value.

19. The system of claim 1, wherein the control circuit is configured to identify a dominant frequency of the vibration, and calculate an aeration percentage from the magnitude of the vibration at the dominant frequency.

* * * * *